(12) United States Patent
Tong et al.

(10) Patent No.: US 12,028,393 B2
(45) Date of Patent: Jul. 2, 2024

(54) WIRELESS MULTIMEDIA APPARATUS AND OPERATION METHOD THEREOF

(71) Applicant: Bestechnic (Shanghai) Co., Ltd., Shanghai (CN)

(72) Inventors: Weifeng Tong, Shanghai (CN); Jun Chen, Shanghai (CN); Liang Zhang, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/080,192

(22) Filed: Dec. 13, 2022

(65) Prior Publication Data
US 2024/0073265 A1 Feb. 29, 2024

(30) Foreign Application Priority Data

Aug. 24, 2022 (CN) .......................... 202211019420.5
Aug. 24, 2022 (CN) .......................... 202211019451.0
Aug. 24, 2022 (CN) .......................... 202211029331.9

(51) Int. Cl.
*H04L 65/60* (2022.01)
*H04W 84/12* (2009.01)
*H04W 88/08* (2009.01)

(52) U.S. Cl.
CPC ............. *H04L 65/60* (2013.01); *H04W 84/12* (2013.01); *H04W 88/08* (2013.01)

(58) Field of Classification Search
CPC ................. H04L 65/60; H04L 65/1059; H04L 65/1095; H04W 84/12; H04W 88/08; H04W 4/80; H04N 21/4363; H04N 21/43637
See application file for complete search history.

(56) References Cited

U.S. PATENT DOCUMENTS

| | | | | |
|---|---|---|---|---|
| 2013/0343202 A1* | 12/2013 | Huseth | ................... | G08B 17/00 370/244 |
| 2015/0350854 A1* | 12/2015 | Pollack | ................... | H04L 51/56 455/466 |
| 2016/0036772 A1* | 2/2016 | Pratapa | ............... | H04L 61/5038 709/245 |

(Continued)

*Primary Examiner* — Tonia L Dollinger
*Assistant Examiner* — Mehulkumar J Shah
(74) *Attorney, Agent, or Firm* — Bayes PLLC

(57) ABSTRACT

In certain aspects, a wireless multimedia apparatus and an operation method thereof are disclosed. The wireless multimedia apparatus includes a system on chip (SoC), including a memory configured to store code and a processor coupled to the memory. When the code is executed, the processor is configured to determine that a router is available and connected to a multimedia provider. The processor is configured to connect to the router based on configuration information associated with the router and receive multimedia data from the multimedia provider via the router. The processor is configured to determine whether the router is still available. Responsive to the router being unavailable, the processor is configured to turn on a softAP based on the configuration information associated with the router to connect to the multimedia provider via the softAP. The processor is configured to receive the multimedia data from the multimedia provider via the softAP.

20 Claims, 20 Drawing Sheets

(56) References Cited

U.S. PATENT DOCUMENTS

| | | | |
|---|---|---|---|
| 2016/0094662 A1* | 3/2016 | Kollu | H04L 43/0882 |
| | | | 709/224 |
| 2016/0267260 A1* | 9/2016 | Jiang | H04W 12/084 |
| 2017/0181059 A1* | 6/2017 | Townend | H04W 24/06 |
| 2018/0115747 A1* | 4/2018 | Bayley | H04W 76/14 |
| 2020/0092515 A1* | 3/2020 | Stern | H04N 21/43635 |
| 2023/0007510 A1* | 1/2023 | Kim | H04W 8/24 |

* cited by examiner

WIRELESS MULTIMEDIA APPARATUS AND OPERATION METHOD THEREOF

CROSS-REFERENCE TO RELATED APPLICATIONS

This application claims the benefit of priority to Chinese Patent Application No. 202211019451.0, filed on Aug. 24, 2022, Chinese Patent Application No. 202211019420.5, filed on Aug. 24, 2022, and Chinese Patent Application No. 202211029331.9, filed on Aug. 24, 2022, all of which are incorporated herein by reference in their entireties.

BACKGROUND

The present disclosure relates to a wireless multimedia apparatus and an operation method thereof.

Various WiFi-based multimedia communication protocols have been developed to allow multiple electronic devices to share content with each other through WiFi networks. For example, a personal computer, a mobile phone, a tablet, or a speaker can share content (e.g., photos, videos, or music) with each other using a WiFi-based multimedia communication protocol which depends on a wireless network created under a WiFi communication protocol, so that a user can access the content through any one of the personal computer, the mobile phone, the tablet, or the speaker.

SUMMARY

According to one aspect of the present disclosure, a wireless multimedia apparatus includes a first system on chip (SoC). The first SOC includes a first memory configured to store first code and a first processor coupled to the first memory. When the first code is executed, the first processor is configured to determine that a router is available and connected to a multimedia provider under a first communication protocol. The first processor is configured to connect to the router based on configuration information associated with the router and receive multimedia data from the multimedia provider via the router under the first communication protocol. The first processor is configured to determine whether the router is still available. Responsive to the router being unavailable, the first processor is configured to turn on a first softAP based on the configuration information associated with the router to connect to the multimedia provider via the first softAP. The first processor is configured to receive the multimedia data from the multimedia provider via the first softAP under the first communication protocol.

According to another aspect of the present disclosure, a wireless multimedia apparatus includes a first multimedia device including a first SoC. The first SoC includes a first memory configured to store first code and a first processor coupled to the first memory. When the first code is executed, the first processor is configured to determine that a router is available and connected to a multimedia provider under a first communication protocol, connect to the router based on configuration information associated with the router, and receive multimedia data from the multimedia provider via the router under the first communication protocol. The first processor is configured to determine whether the router is still available. Responsive to the router being unavailable, the first processor is configured to turn on a softAP based on the configuration information associated with the router to connect to the multimedia provider via the softAP, and receive the multimedia data from the multimedia provider via the softAP under the first communication protocol. The wireless multimedia apparatus further includes a second multimedia device including a second SoC. The second SoC includes a second memory configured to store second code and a second processor coupled to the second memory. When the second code is executed, the second processor is configured to receive the multimedia data from the first multimedia device.

According to yet another aspect of the present disclosure, a wireless communication method for a wireless multimedia apparatus is disclosed. The wireless communication method may include determining, by a processor of the wireless multimedia apparatus, that a router is available and connected to a multimedia provider under a first communication protocol. The wireless communication method may include connecting, by the processor, the wireless multimedia apparatus to the router based on configuration information associated with the router. The wireless communication method may include receiving, by the processor, multimedia data from the multimedia provider via the router under the first communication protocol. The wireless communication method may include determining, by the processor, whether the router is still available. Responsive to the router being unavailable, the wireless communication method may include turning on, by the processor, a softAP based on the configuration information associated with the router to connect to the multimedia provider via the softAP. The wireless communication method may include receiving, by the processor, the multimedia data from the multimedia provider via the softAP under the first communication protocol.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1A:
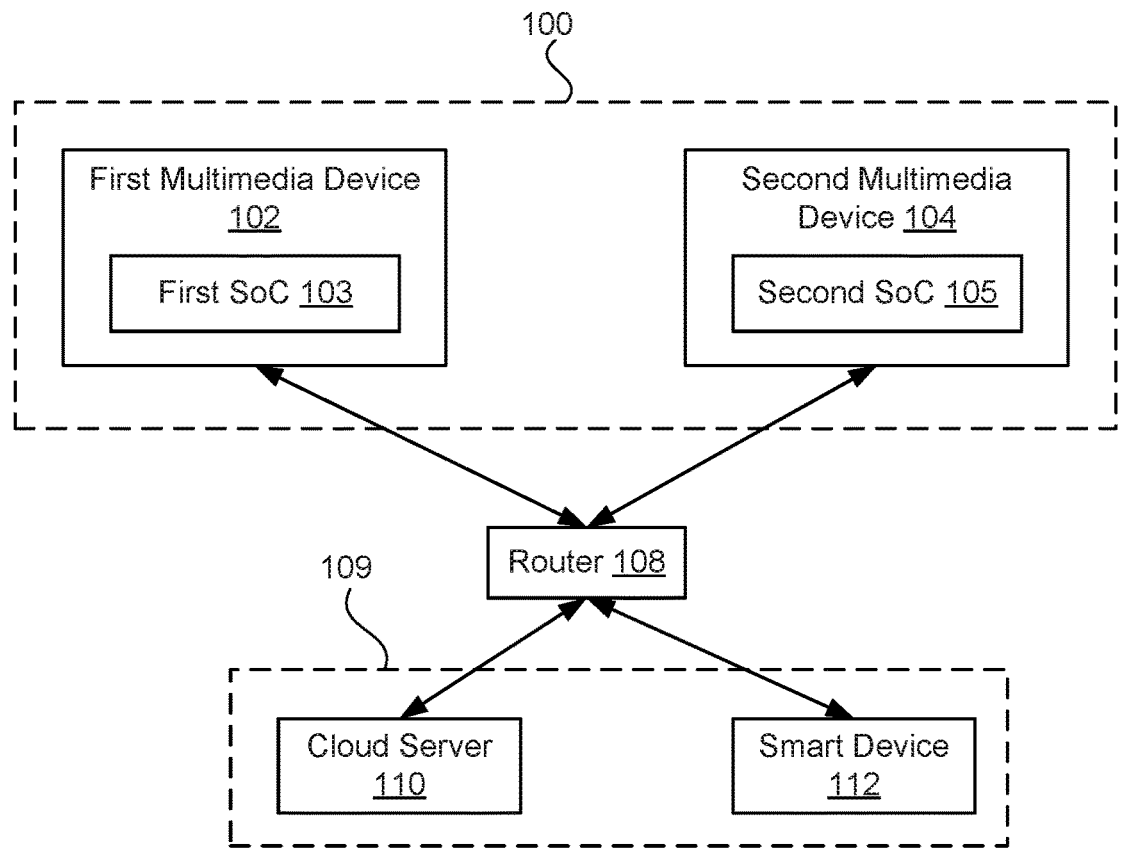
FIG. 1A illustrates a block diagram of an exemplary wireless multimedia system under a first mode, according to some aspects of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In some applications, a WiFi-based multimedia communication protocol can be used to push audio data from a smart device to a separate headphone for playback, so that a better audio-listening experience can be achieved through the headphone. For example, an airplay protocol can be used to push audio data from a smart phone to a wireless headphone which supports the airplay protocol for playback. The wireless headphone that supports the airplay protocol can be used in an indoor wireless local area network (LAN) environment, so that the wireless headphone and the smart phone can connect to the same wireless router (or a WiFi access point integrated on the router), which is used to form the indoor wireless LAN that the airplay protocol depends on. However, the reliance on the router may lead to limitations on usage scenarios of the airplay protocol. For example, with respect to a mobile usage scenario, if a user with the smart device and the wireless headphone moves to a different room that has a different wireless LAN established by a different router, the smart device and the headphone may need to be reconfigured to connect to the different wireless LAN again in order to use the airplay protocol to share the audio data. This reconfiguration can cause inconvenience for the user and downgrade the use experience of the headphone. In another example, if the user with the smart device and the wireless headphone moves to an outdoor environment where no router is available, the smart device and the headphone may fail to use the airplay protocol to share the audio data.

Consistent with some aspects of the present disclosure, a wireless multimedia apparatus, a wireless multimedia system, and an operation method thereof are disclosed herein to utilize wireless multimedia communication protocols for multimedia data sharing among different devices. For example, the wireless multimedia apparatus disclosed herein may determine that a router is available and is connected to a multimedia provider under a first communication protocol (e.g., a first wireless multimedia communication protocol). Then, the wireless multimedia apparatus may connect to the router based on configuration information associated with the router, and receive multimedia data from the multimedia provider via the router under the first communication protocol. Afterwards, the wireless multimedia apparatus may determine whether the router is still available. Responsive to the router being unavailable, the wireless multimedia apparatus may turn on a first soft access point (softAP) based on the configuration information associated with the router, connect to the multimedia provider via the first softAP, and receive the multimedia data from the multimedia provider via the first softAP under the first communication protocol.

In this case, the wireless multimedia apparatus may be used in different mobile scenarios without any complicated network distribution or reconfiguration process. For example, a user may carry the wireless multimedia apparatus and move to various locations freely. If a router is available in a particular location, it can be utilized to share multimedia data from the multimedia provider (e.g., a smart device) to the wireless multimedia apparatus stably and conveniently with low power consumption. However, when the router in the location becomes unavailable, the wireless multimedia apparatus can connect to the smart device via the first softAP to continue receiving the multimedia data from the smart device in a stable and convenient manner without incurring any complicated network reconfiguration process. The first softAP may be established in the wireless multimedia apparatus or a charge station associated with the wireless multimedia apparatus. Throughout the entire process when the user moves freely to the different locations, a stable and convenient usage experience of the wireless multimedia apparatus can be maintained for the user.

Consistent with some aspects of the present disclosure, the wireless multimedia apparatus may be an electronic device that includes one or more audio playing devices, one or more video playing devices, or any combination thereof. The combination of the audio playing devices and the video playing devices in the wireless multimedia apparatus depends on a specific application scenario of the wireless multimedia apparatus. For example, in a movie-viewing scenario, the wireless multimedia apparatus may include a pair of headphones and a display device. In another example, in a game playing scenario, the wireless multimedia apparatus may include a pair of headphones and a pair of smart glasses.

Consistent with some aspects of the present disclosure, the wireless multimedia apparatus may include a first multimedia device (e.g., which acts as a primary multimedia device) and a second multimedia device (e.g., which acts as a secondary multimedia device). If a primary-secondary switching condition is satisfied, a primary-secondary switching process may be performed between the first and second multimedia devices to improve the power efficiency of the wireless multimedia apparatus.

Exemplary wireless multimedia communication protocols (also referred to as "communication protocol" for convenience) may include, but are not limited to, the following: an airplay protocol; a digital living network alliance (DLNA) protocol; a Miracast protocol; a Bluetooth protocol; or a modified o upgraded version of any of the airplay protocol, the DLNA protocol, the Miracast protocol, or the Bluetooth protocol. Each of the airplay protocol, the DLNA protocol, and the Miracast protocol can be used to wirelessly transmit the multimedia data from the multimedia provider to the wireless multimedia apparatus through a wireless LAN created by a router or a softAP.

Exemplary multimedia data may include, but is not limited to, text data, image data, audio data, video data, or any combination thereof. Exemplary multimedia providers may include a smart device (e.g., a smart phone, a portable music player, a game controller, a smart watch, etc.), a cloud server, or any other device configured to provide multimedia data.

Further, examples of the wireless multimedia apparatus disclosed herein may include, but are not limited to, a speaker (or, a set of speakers for a set of different channels), a wireless headset which connects a left speaker and a right speaker with a wire, a wireless headphone, a smart television (TV), a pair of smart glasses, a display, or any other suitable wireless multimedia apparatus capable of receiving and playing the multimedia data. Exemplary wireless headphones may include, but are not limited to, a true wireless stereo (TWS) headphone (also known as untethered headphone), which is a type of wireless headphones that remove the wires between the left and right speakers, or a pair of earbuds (or earpieces), etc.

Figure 1B:
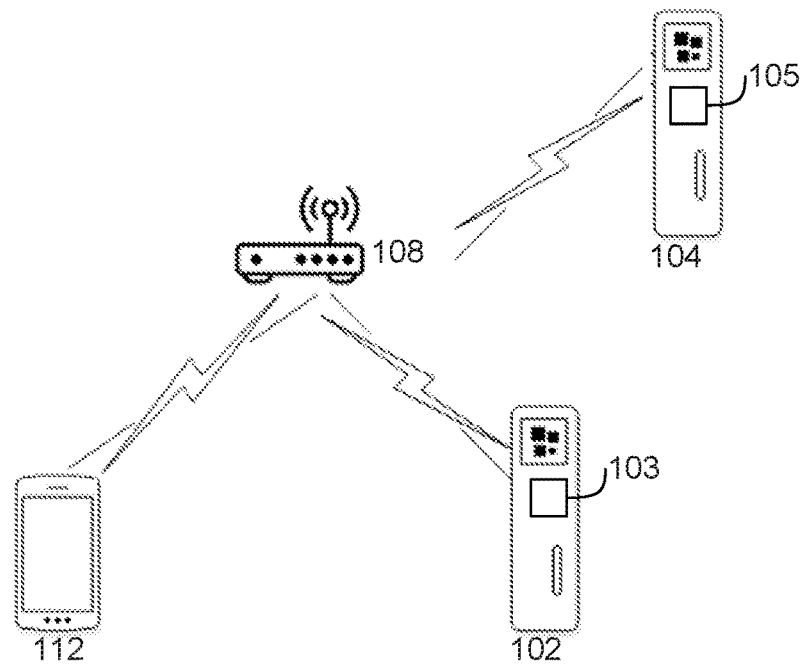
FIG. 1B is a graphical representation illustrating an exemplary wireless multimedia system under a first mode, according to some aspects of the present disclosure.

FIG. 1A illustrates a block diagram of an exemplary wireless multimedia system under a first mode, according to some aspects of the present disclosure. FIG. 1B is a graphical representation illustrating an exemplary wireless multimedia system under the first mode, according to some aspects of the present disclosure. FIGS. 1A and 1B are described below together. The wireless multimedia system shown in FIG. 1A or 1B may include a wireless multimedia apparatus 100, a router 108, and one or more multimedia providers 109 (e.g., a cloud server 110, a smart device 112, etc.). Router 108 may create a wireless LAN using a WiFi communication protocol, such as IEEE 802.11a, IEEE 802.11b, IEEE 802.11g, IEEE 802.11n, IEEE 802.11ac, or IEEE 802.11ax, etc. Both wireless multimedia apparatus 100 and multimedia provider 109 support the application of a WiFi-based multimedia communication protocol such as the airplay protocol or the DLNA protocol. The application of the WiFi-based multimedia communication protocol may depend on the wireless LAN created using the WiFi communication protocol. Under the first mode, wireless multimedia apparatus 100 may be connected to multimedia provider 109 via router 108 (e.g., through the wireless LAN created by router 108).

In some implementations, wireless multimedia apparatus 100 may include one or more multimedia devices. By way of examples, wireless multimedia apparatus 100 disclosed herein may include at least one of a first multimedia device 102 or a second multimedia device 104. First multimedia device 102 may include a first SoC 103 and any other suitable components. Second multimedia device 104 may include a second SoC 105 and any other suitable components. An exemplary structure of first multimedia device 102 or second multimedia device 104 is illustrated below with reference to FIG. 4. For example, first and second multimedia devices 102, 104 can be a left earbud and a right earbud of a wireless headphone, respectively. In another example, each of first and second multimedia devices 102, 104 can be a respective speaker of an entertainment system.

Under the first mode, wireless multimedia apparatus 100 (e.g., first SoC 103 of first multimedia device 102 or second SoC 105 of second multimedia device 104) may determine that router 108 is available and is connected to multimedia provider 109 under the first communication protocol (e.g., a WiFi-based multimedia communication protocol). First SoC 103 or second SoC 105 of wireless multimedia apparatus 100 may receive configuration information associated with router 108 from multimedia provider 109 under a second communication protocol (e.g., a Bluetooth protocol, a Bluetooth low energy (BLE) protocol, etc.). Alternatively, first SoC 103 or second SoC 105 may receive the configuration information associated with router 108 manually (e.g., from a user of wireless multimedia apparatus 100). First SoC 103 and/or second SoC 105 of wireless multimedia apparatus 100 may connect to router 108 based on the configuration information associated with router 108, and receive multimedia data from multimedia provider 109 via router 108 under the first communication protocol. In some implementations, the configuration information associated with router 108 may include a network name and a password of router 108. In some implementations, the configuration information may include a Service Set Identifier (SSID), a Basic Service Set Identifier (BSSID), a Media Access Control (MAC) address, or a secrete key, etc.

The following description of FIGS. 1A-1B is provided by taking smart device 112 as an example of multimedia provider 109. It is contemplated that the description is also applicable to a scenario when cloud server 110 is used as an example of multimedia provider 109, which is not limited herein. Also, in the following description of FIGS. 1A-2G, 6, and 8-11, first multimedia device 102 is configured to act as a primary multimedia device, and second multimedia device 104 is configured to act as a secondary multimedia device. It is contemplated that the description is also applicable to a scenario where second multimedia device 104 is configured to act as the primary multimedia device, and first multimedia device 102 is configured to act as the secondary multimedia device, which is not limited herein.

Initially, router 108 can be used to establish a wireless LAN based on a WIFI communication protocol. A network configuration process of the wireless LAN can be performed among smart device 112, first SoC 103 of first multimedia device 102, and second SoC 105 of second multimedia device 104. For example, after smart device 112 is connected to router 108, first SoC 103 may receive the configuration information associated with router 108 from smart device 112 through a Bluetooth or BLE connection between smart device 112 and first SoC 103. This is because smart device 112, which is connected to router 108, already learns the configuration information associated with router 108 and can send the configuration information to first SoC 103. As a result, first SoC 103 can connect to router 108 using the configuration information associated with router 108. Then, first SoC 103 can send the configuration information to second SoC 105 through a Bluetooth connection between first SoC 103 and second SoC 105, so that second SoC 105 can also connect to router 108 using the configuration information associated with router 108. Alternatively, smart device 112 (rather than first SoC 103) can also send the configuration information to second SoC 105 through a Bluetooth or BLE connection between smart device 112 and second SoC 105, so that second SoC 105 can connect to router 108 using the configuration information associated with router 108.

Next, first SoC 103 and/or second SoC 105 can receive multimedia data from smart device 112 via router 108 using the first communication protocol. In this case, router 108 operates as an information exchange hub in the wireless LAN. It is noted that a networking role determined by a WiFi communication protocol can be referred to as an access point (AP). Router 108 can be integrated with and used as a WiFi access point. For example, when router 108 is available, first multimedia device 102 and second multimedia device 104 of wireless multimedia apparatus 100 can access the multimedia data from smart device 112 via router 108. As a result, the sharing of the multimedia data from smart device 112 to wireless multimedia apparatus 100 can be achieved stably and conveniently with low power consumption (e.g., when compared with the sharing of the multimedia data form smart device 112 to wireless multimedia apparatus 100 using the Bluetooth or BLE connection).

Subsequently, wireless multimedia apparatus 100 may determine whether router 108 is still available. In some implementations, first SoC 103 may be configured to receive a message from smart device 112 under a second communication protocol (e.g., via a Bluetooth or BLE connection between first multimedia device 102 and smart device 112). The message may describe a connection status between smart device 112 and router 108. First SoC 103 may determine whether smart device 112 remains connected with router 108 based on the message. Responsive to smart device 112 remaining connected with router 108 (e.g., the message may indicate that smart device 112 succeeds in connecting to router 108 within a predetermined time window such as several seconds or several dozens of seconds, etc.), first SoC 103 may determine that router 108 is still available. Or, responsive to smart device 112 losing connection with router 108 (e.g., the message may indicate that smart device 112 keeps failing to connect to router 108 for the predetermined time window), first SoC 103 may determine that router 108 is unavailable.

For example, to determine the availability of router 108, first SoC 103 may determine whether it can continue to connect to router 108. Or, first SoC 103 may communicate with smart device 112 to learn a connection status between smart device 112 and router 108 via a Bluetooth connection between first multimedia device 102 and smart device 112. If first SoC 103 itself fails to connect to router 108 (or, the connection status indicates that smart device 112 fails to connect to router 108), first SoC 103 may determine that router 108 is unavailable.

Responsive to router 108 still being available, first SoC 103 and/or second SoC 105 of wireless multimedia apparatus 100 may continue receiving the multimedia data from smart device 112 via router 108. However, responsive to router 108 being unavailable, first SoC 103 may establish a first softAP (e.g., a first softAP 130 shown in FIG. 1C) based on the configuration information associated with router 108, and connect to smart device 112 to receive the multimedia data from smart device 112 via the first softAP under the first communication protocol, which is described below in more detail with reference to FIGS. 1C-2G and 6.

Consistent with some aspects the present disclosure, the first softAP may be an access point (e.g., a WiFi access point) implemented using software and hardware integrated on a multimedia device (e.g., first multimedia device 102) of wireless multimedia apparatus 100. For example, through the software setting of the first softAP, first multimedia device 102 itself can be used as a WiFi access point. In some implementations, the first softAP may include a WiFi hotspot with the same configuration information as router 108. The first softAP may not only be used to connect to smart device 112 to obtain the multimedia data, but also can replace router 108 to set up the wireless LAN upon which the first communication protocol (e.g., the WiFi-based multimedia communication protocol) depends.

In some implementations, first SoC 103 of first multimedia device 102 can dynamically monitor the availability of router 108. When router 108 becomes unavailable, first multimedia device 102 can rely on the first softAP (without further relying on any other relay components) to connect to smart device 112. Moreover, since the first softAP is created according to the configuration information associated with router 108, smart device 112 can automatically connect to the first softAP with no need to perform a complex network reconfiguration process with wireless multimedia apparatus 100 again. Smart device 112 and wireless multimedia apparatus 100 can continue to share the multimedia data stably and conveniently even if the user moves to locations where router 108 is unavailable. Thus, the use experience (e.g., the listening experience, the visual experience) of wireless multimedia apparatus 100 can be improved.

In some implementations, first SoC 103 may detect that router 108 is available again after a period of time. For example, the user who carries wireless multimedia apparatus 100 may move back to a room where router 108 is located after a period of time. Then, first SoC 103 may detect that it can connect to router 108 again based on the configuration information associated with router 108. Or, first SoC 103 may receive an updated connection status from smart device 112, which indicates that smart device 112 can connect to router 108 again based on the configuration information associated with router 108. In this case, first SoC 103 may turn off the first softAP since router 108 becomes available again. First SoC 103 and second SoC 105 may resume using router 108 for receiving the multimedia data from smart device 112 to save power consumption of first and second multimedia devices 102 and 104. That is, first multimedia device 102 consumes its own energy and computing resources to turn on the first softAP only when router 108 fails to fulfill the duty of a WiFi access point, and power consumption, as well as computing resource consumption, can be saved on first multimedia device 102 by turning off the first softAP when router 108 is available.

Figure 1C:
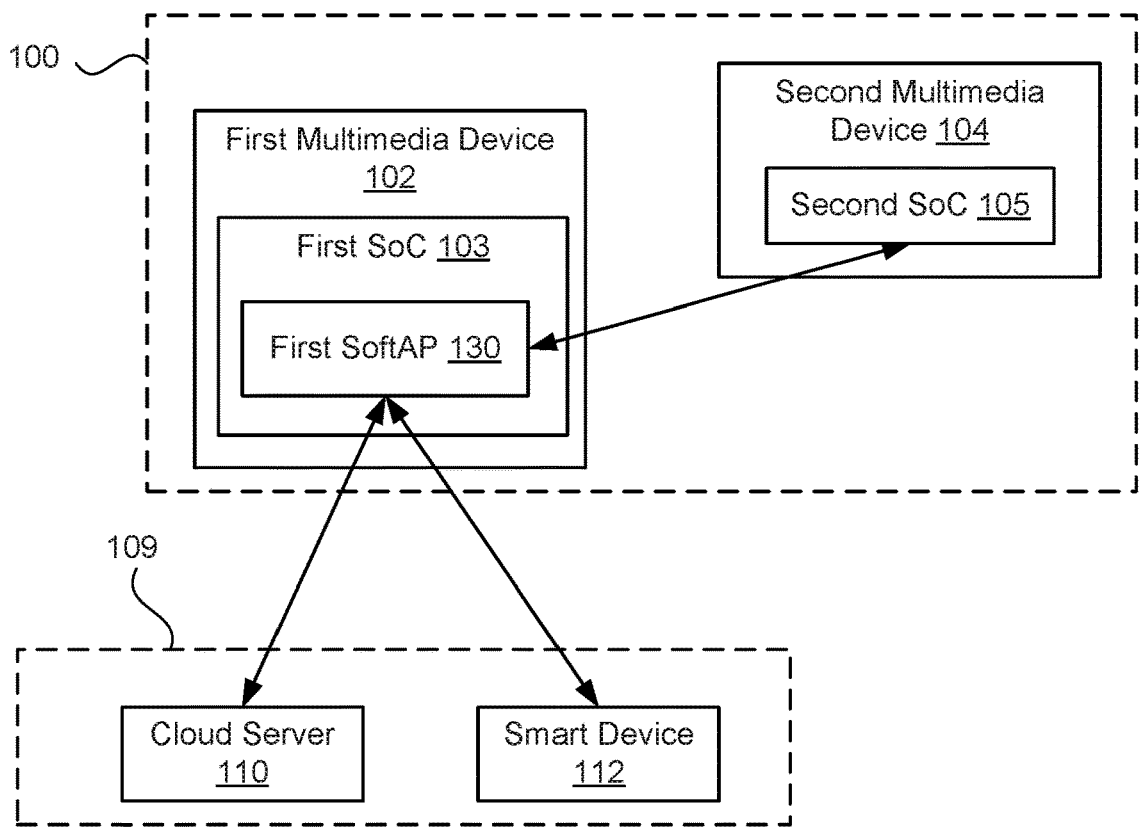
FIG. 1C illustrates a block diagram of an exemplary wireless multimedia system under a second mode, according to some aspects of the present disclosure.
Figure 1D:
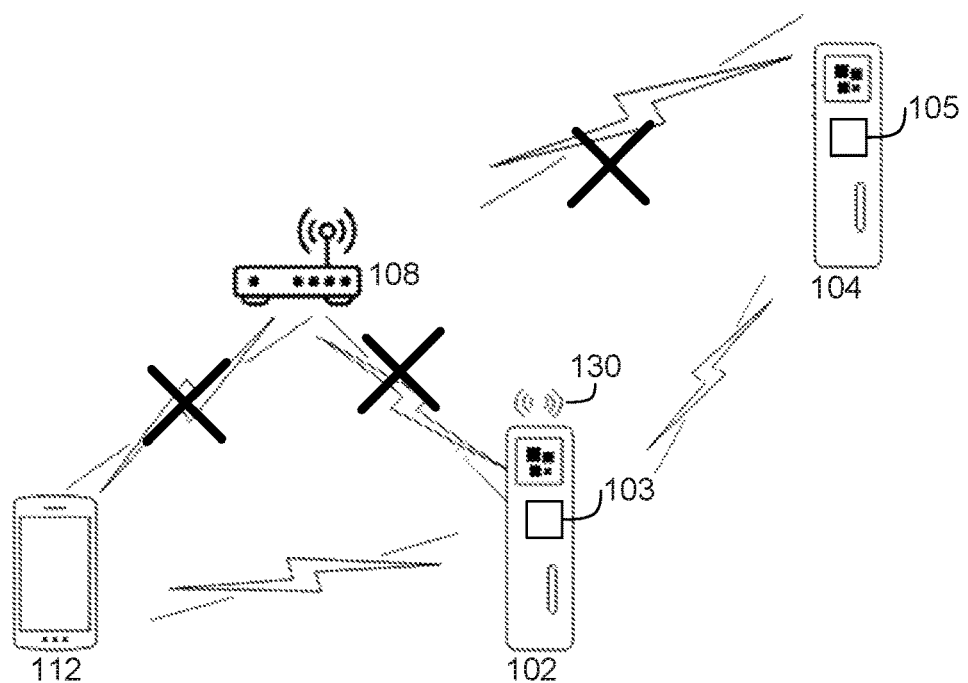
FIG. 1D is a graphical representation illustrating an exemplary wireless multimedia system under a second mode, according to some aspects of the present disclosure.

FIG. 1C illustrates a block diagram of an exemplary wireless multimedia system under a second mode, according to some aspects of the present disclosure. FIG. 1D is a graphical representation illustrating an exemplary wireless multimedia system under the second mode, according to some aspects of the present disclosure. FIGS. 1C and 1D are described below together. Compared with the wireless multimedia system of FIGS. 1A-1B, the wireless multimedia system shown in FIGS. 1C-1D may not include router 108 since router 108 becomes unavailable. Under the second mode, first softAP 130 can be created or turned on in first SoC 103 since first multimedia device 102 acts as the primary multimedia device. For example, responsive to determining that router 108 is unavailable, first SoC 103 may turn on first softAP 130 based on the configuration information associated with router 108, connect to multimedia provider 109 (e.g., smart device 112) via first softAP 130, and receive the multimedia data from smart device 112 via first softAP 130 under the first communication protocol.

In some implementations, first multimedia device 102 may be configured to act as the primary multimedia device to receive the multimedia data from smart device 112 via first softAP 130 responsive to router 108 being unavailable. Second multimedia device 104 may be coupled to first multimedia device 102, and configured to act as the secondary multimedia device to receive the multimedia data from first multimedia device 102.

In some implementations, first softAP 130 can operate as a relay point for relaying the multimedia data from first multimedia device 102 to second multimedia device 104. In this case, second multimedia device 104 may receive the multimedia data via first softAP 130 from first multimedia device 102. The relay of the multimedia data from first multimedia device 102 to second multimedia device 104 is described below in more detail with reference to FIGS. 2A-2C.

Alternatively, a first connection under the first communication protocol can be established between smart device 112 and first multimedia device 102 via first softAP 130. First multimedia device 102 can be configured to receive the multimedia data from smart device 112 using the first connection. A second connection can be established between first and second multimedia devices 102, 104, and second multimedia device 104 can be configured to receive the multimedia data from first multimedia device 102 using the second connection. For example, the second connection can be established between first multimedia device 102 and second multimedia device 104 via a second softAP created in second multimedia device 104 under the first communication protocol. In this case, the first and second connections can be DLNA connections, as described below in more detail with reference to FIGS. 2D-2E. In another example, the second connection can be established between first and second multimedia devices 102, 104 under a second communication protocol. In this case, the second connection can be a Bluetooth connection, and the first connection can be a DLNA connection or an airplay connection, as described below in more detail with reference to FIGS. 2F-2G.

In some implementations, first SoC 103 may detect whether first multimedia device 102 and second multimedia device 104 are in a charge station. For example, to detect whether first multimedia device 102 and/or second multimedia device 104 are in the charge station, first SoC 103 may detect whether first SoC 103 and/or second SoC 105 can communicate with the charge station through wired communication. If at least one of first SoC 103 and second SoC 105 can communicate with the charge station through wired communication, it is detected that the at least one of first SoC 103 and second SoC 105 is in the charge station. Specifically, first SoC 103 may determine whether a first contact point in first multimedia device 102 and a second contact point in second multimedia device 104 are in direct contact with respective contact points in the charge station. If the first and second contact points contact the respective contact points in the charge station directly, first SoC 103 may determine that first multimedia device 102 and second multimedia device 104 are in the charge station. If the first (or second) contact point does not contact the respective contact point in the charge station, first SoC 103 may determine that first multimedia device 102 (or second multimedia device 104) is out of the charge station. In another example, first SoC 103 may communicate with the charge station through a wireless communication (e.g., Bluetooth communication) to determine whether first multimedia device 102 and second multimedia device 104 are in the charge station. In yet another example, first SoC 103 may determine whether first multimedia device 102 or second multimedia device 104 is in the charge station based on a detection result of a sensor (e.g., a sensor 410 in FIG. 4) installed in first multimedia device 102 or second multimedia device 104. Specifically, the sensor can be an optical sensor. When first multimedia device 102 (or second multimedia device 104) is in the charge station, the optical sensor may detect a significant reduction in the energy of the incoming light. Thus, if the reduction in the energy of the incoming light exceeds a threshold, first SoC 103 may determine that first multimedia device 102 (or second multimedia device 104) is in the charge station.

Thus, responsive to detecting that first multimedia device 102 and second multimedia device 104 are in the charge station, first SoC 103 may turn off first softAP 130. Or, responsive to detecting that at least one of first multimedia device 102 or second multimedia device 104 is out of the charge station and router 108 is unavailable, first SoC 103 may turn on first softAP 130.

In some implementations, first SoC 103 may detect whether at least one of first multimedia device 102 or second multimedia device 104 is in an ear of the user (e.g., whether at least one of a left earbud or a right earbud is in the ear of the user). For example, first SoC 103 can perform an in-ear detection for first multimedia device 102 using a sensor installed in first multimedia device 102. The sensor can be a capacitive sensor, an optical sensor, or the like. If first multimedia device 102 is in the ear, a detected light from the optical sensor or a detected capacitance from the capacitive sensor may change significantly. If a change in the detected light or the detected capacitance exceeds a threshold, first SoC 103 may determine that first multimedia device 102 is in the ear. Thus, responsive to detecting that first multimedia device 102 and second multimedia device 104 are not in the ears of the user, first SoC may turn off first softAP 130. Or, responsive to detecting that at least one of first multimedia device 102 or second multimedia device 104 is in the ear and router 108 is unavailable, first SoC may turn on first softAP 130.

By taking first and second multimedia devices 102, 104 to be a pair of earbuds as an example, first SoC 103 can determine the likelihood that the user wants to use the pair of earbuds based on the detection of whether the pair of earbuds are in a charge box (or worn by the user in the ears). This is because when people want to use the pair of earbuds to play audio data, they usually take at least one of the earbuds out of the charging box (or wear at least one of the earbuds in an ear). Thus, if at least one of the earbuds is out of the charging box (or worn by the user in the ear), first SoC 103 can determine that the user wants to use the at least one of the earbuds to play audio data, and first softAP 130 can be turned on for accessing the audio data from smart device 112. Or, if the pair of earbuds are in the charging box (or not worn in the ears of the user), first SoC 103 can determine that they are not used to play audio data, and first softAP 130 can be turned off. Thus, power consumption and risk of privacy exposure can be reduced by turning off first softAP 130 when no audio data is played by the earbuds. It is noted that the charge box disclosed herein is only an example of charge station 802. Other examples of charge station 802 may include, for example, a charge case, a charge pile, a charge stand, etc., which are not limited herein.

In some implementations, the smart device connected to router 108 in FIGS. 1A-1B can be the same smart device connected to first softAP 130 in FIGS. 1C-1D. In some implementations, the smart device connected to router 108 in FIGS. 1A-1B can be different from the smart device connected to first softAP 130 in FIGS. 1C-1D. For example, after a network configuration process is performed between a first smart device and wireless multimedia apparatus 100 via router 108 in FIGS. 1A-1B (e.g., wireless multimedia apparatus 100 is connected to router 108 using the configuration information of router 108), a second smart device can also be configured to connect to wireless multimedia apparatus 100 via router 108. Then, the first smart device as well as the second smart device can be connected to wireless multimedia apparatus 100 via first softAP 130 when router 108 is unavailable. In this case, the first and second smart devices can operate as follows: the first smart device can be used to assist wireless multimedia apparatus 100 to complete the network configuration process with router 108 when router 108 is available, whereas the second smart device can be used to push the multimedia data to wireless multimedia apparatus 100 via first softAP 130 when router 108 is unavailable.

Although FIGS. 1A-1B show that a network configuration process can be performed between smart device 112 and wireless multimedia apparatus 100 via one router 108, multiple network configuration processes can be performed between smart device 112 and wireless multimedia apparatus 100 via multiple routers 108 using multiple sets of configuration information associated with the multiple routers 108, respectively. The multiple sets of configuration information associated with the multiple routers 108 can be saved by first SoC 103. As a result, first SoC 103 may select one of the multiple sets of configuration information to establish first softAP 130 based on an instruction from smart device 112.

In some implementations, wireless multimedia apparatus 100 may create first softAP 130 based on the configuration information of router 108 even if router 108 is available. However, wireless multimedia apparatus 100 may turn off first softAP 130 when router 108 is available to save power consumption, and turn on first softAP 130 when router 108 becomes unavailable. In this way, the adoption of first softAP 130 when router 108 becomes unavailable may take a shorter time. For example, when the user moves to a different location (e.g., from indoor to outdoor) while listening to music, the time spent on enabling first softAP 130 can be shorter, and the response to the unavailability of router 108 can be faster. As a result, the music-listening experience of the user through wireless multimedia apparatus 100 is not disrupted by the unavailability of router 108. The use experience of wireless multimedia apparatus 100 can be enhanced.

In some other implementations, wireless multimedia apparatus 100 may create first softAP 130 based on the configuration information of router 108 after router 108 becomes unavailable, and keep turning on first softAP 130 as long as router 108 is unavailable.

Figure 4:
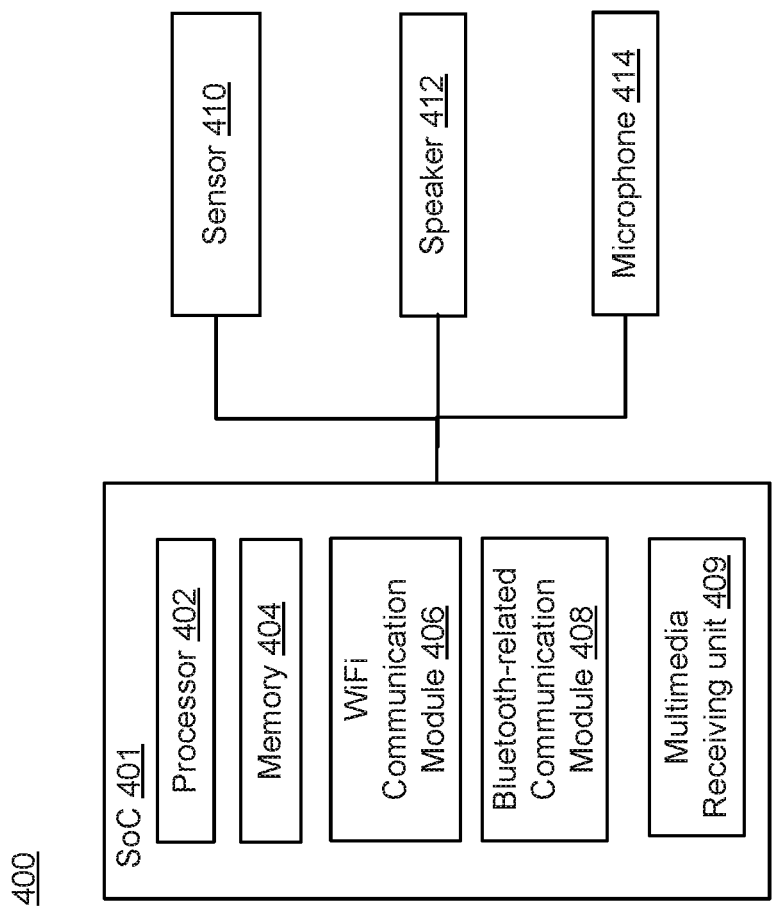
FIG. 4 illustrates a block diagram of an exemplary multimedia device, according to some aspects of the present disclosure.

In some implementations, first SoC 103 may receive the configuration information of router 108 from smart device 112 via a Bluetooth or BLE connection and store the configuration information in a memory device (e.g., a memory 404 of FIG. 4). When first softAP 130 is to be created, first SoC 103 can retrieve the stored configuration information of router 108 from its memory device and create first softAP 130 accordingly. That is, first SoC 103 can monitor an availability state of router 108 and create (or turn on) first softAP 130 automatically when router 108 is unavailable without manual intervention by the user. There is no need to perform a network configuration process between smart device 112 and wireless multimedia apparatus 100 via first softAP 130. There is also no need to manually re-set the relevant configuration information on smart device 112 for first softAP 130 since first softAP 130 is created using the same configuration information as router 108. Thus, the use experience of wireless multimedia apparatus 100 can be improved. Alternatively, the user may input the configuration information of first softAP 130 manually or select the configuration information of first softAP 130 from a list of available configuration information manually. First SoC 103 may create first softAP 130 based on the manually-input or manually-selected configuration information. In this case, the user may have the flexibility to select which configuration information to be used for the establishment of first softAP 130.

Figure 2A:
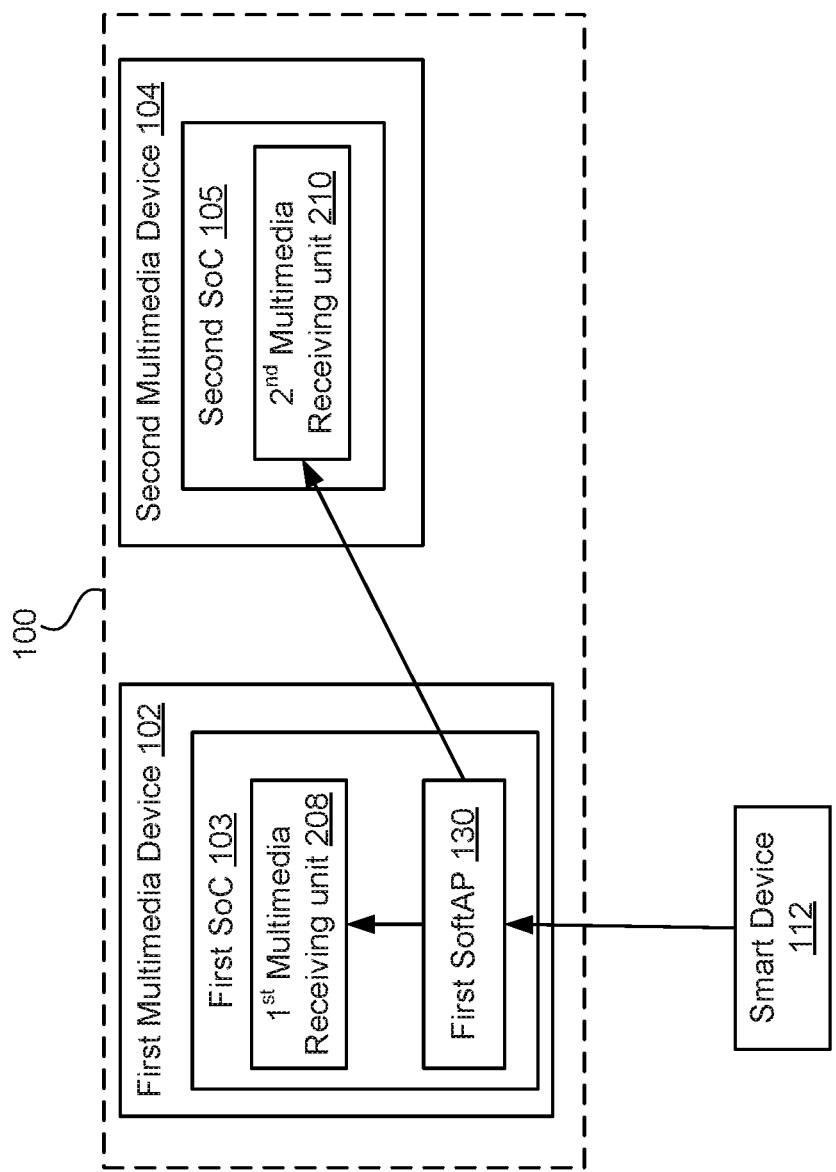
FIGS. 2A-2G illustrate various exemplary connection ways among a smart device, a first multimedia device, and a second multimedia device under a second mode, according to some aspects of the present disclosure.
Figure 2C:
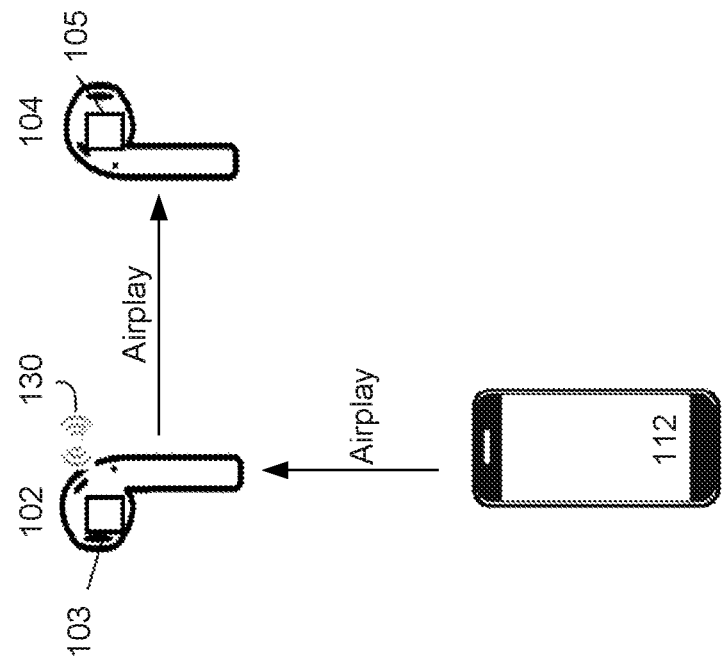
Figure 2B:
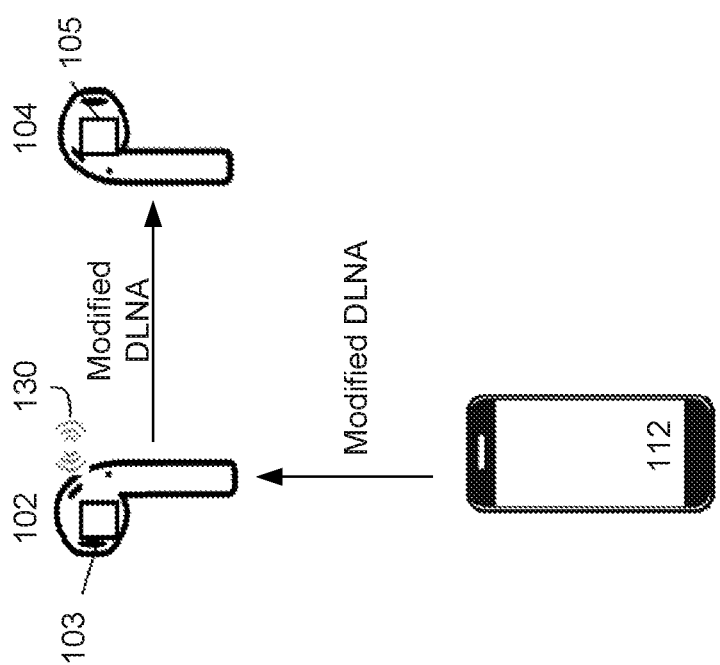

FIGS. 2A-2C illustrate a first exemplary connection way among smart device 112, first multimedia device 102, and second multimedia device 104 under the second mode, according to some aspects of the present disclosure. In the first exemplary connection way, first softAP 130 can act as a relay point for relaying the multimedia data received from smart device 112 to a plurality of multimedia devices including, but not limited to, first and second multimedia devices 102, 104. In some implementations, first softAP 130 may be integrated into first SoC 103 of first multimedia device 102. First SoC 103 may additionally include a first multimedia receiving unit 208 configured to receive the multimedia data. Second SoC 105 of second multimedia device 104 may additionally include a second multimedia receiving unit 210 configured to receive the multimedia data. For example, when router 108 is unavailable, first SoC 103 may create (or turn on) first softAP 130 and connect to smart device 112 via first softAP 130. First SoC 103 may receive the multimedia data from smart device 112 via first softAP 130, and forward the multimedia data to first multimedia receiving unit 208 for storage. Further, second SoC 105 may also receive the multimedia data from smart device 112 through a relay of first softAP 130, and forward the multimedia data to second multimedia receiving unit 210 for storage. In this case, a customized DLNA protocol (e.g., as shown in FIG. 2B) or an airplay protocol (e.g., as shown in FIG. 2C) can be used to implement the communication among smart device 112, first multimedia device 102, and second multimedia device 104 under the second mode.

It is contemplated that a one-to-one data transmission may be achieved from smart device 112 to first multimedia device 102 via first softAP 130 if the DLNA protocol is applied in the communication among smart device 112, first multimedia device 102, and first softAP 130. That is, smart device 112 can only transmit the multimedia data to one multimedia device (e.g., first multimedia device 102) via first softAP 130 through the DLNA protocol. However, the DLNA protocol can be modified to form a modified (or customized) DLNA protocol which allows first softAP 130 to act as a relay point (or, a repeater) to forward the multimedia data received from smart device 112 to a plurality of multimedia devices (e.g., first and second multimedia devices 102, 104). That is, through the modified DLNA protocol, a one-to-many data transmission can be achieved from smart device 112 to the plurality of multimedia devices via first softAP 130, as shown in FIGS. 2A-2C.

Referring to FIG. 2B, smart device 112 may support a modified (or customized) DLNA protocol which allows first softAP 130 to act as a relay point to forward the multimedia data received from smart device 112 to first and second multimedia devices 102, 104. For example, first softAP 130 may forward the multimedia received from smart device 112 to first and second multimedia receiving units 208, 210 of first and second multimedia devices 102, 104, respectively. In this case, a WiFi communication mode is adopted by using first softAP 130 as a WiFi hotspot to support the one-to-many data transmission.

It is contemplated that the airplay protocol also allows first softAP 130 to act as a relay point (or, a repeater) to forward the multimedia data received from smart device 112 to a plurality of multimedia devices. That is, through the airplay protocol, a one-to-many data transmission can be achieved from smart device 112 to the plurality of multimedia devices via first softAP 130. Referring to FIG. 2C, smart device 112, first multimedia device 102, and second multimedia device 104 may support the airplay protocol, so that first softAP 130 can receive the multimedia data from smart device 112 and forward the multimedia data to first and second multimedia devices 102, 104, respectively.

With combined reference to FIGS. 2A-2C, an exemplary operation process of wireless multimedia apparatus 100 is described herein by taking a pair of earphones (e.g., a primary earphone and a secondary earphone) as an example. Under the first mode, when a router (e.g., router 108) is available, smart device 112 may share the multimedia data with the primary earphone and the secondary earphone using the router through the DLNA protocol or the airplay protocol. At least one of the primary or secondary earphone stores the configuration information of the router, and the configuration information may include a network name and a password of the router.

When the router becomes unavailable, the second mode is activated so that the primary earphone may create first softAP 130 according to the configuration information of the router (or may turn on first softAP 130 if it is created previously). Because smart device 112 has been connected to the router associated with the configuration information, smart device 112 can automatically connect to first softAP 130 created by the primary earphone, without requiring the user to manually input the configuration information of first softAP 130. This automatic connection to first softAP 130 by smart device 112 can facilitate the user's usage of the pair of earphones. For example, after the configuration information of the router is set for the primary and secondary earphones in a room, the user does not need to manually input the configuration information when smart device 112 is connected to first softAP 130 during the unavailability of the router (e.g., when the user moves from the room to outdoors or to a different room). Smart device 112 can automatically connect to first softAP 130 created based on the configuration information of the router, and continue pushing the multimedia data to the primary and secondary earphones via first softAP 130.

In some implementations, there is no need to store the configuration information of the router on smart device 112. Then, after the primary earphone creates first softAP 130, the user can manually enter the configuration information of first softAP 130 on smart device 112, so that smart device 112 can connect to first softAP 130.

In some implementations, the primary and the secondary earphones are set in a low-power standby mode. A Bluetooth-related connection (e.g., a classic Bluetooth connection, a BLE connection, or a low energy audio connection, etc.) can be established between smart device 112 and the primary earphone. When smart device 112 has audio data to send to the primary and secondary earphones, smart device 112 may send a notification to the primary earphone through the BLE connection. For example, smart device 112 may determine whether it can connect to the router successfully. If smart device 112 can connect to the router successfully, smart device 112 may use the router to transmit the audio data to the primary and second earphones. If smart device 112 fails to connect to the router, it may notify the primary earphone of its failure to connect to the router and may instruct the primary earphone to create or turn on first softAP 130.

Then, responsive to the router being unavailable and receiving the notification from smart device 112, the primary earphone may create or turn on first softAP 130 so that smart device 112 can connect to first softAP 130 and transmit the multimedia data to the primary and secondary earphones via first softAP 130. In this low-power standby mode, when smart device 112 does not have audio data to send to the primary and secondary earphones, first softAP 130 may not be turned on, whereas the Bluetooth-related connection can be activated. The power consumption can be reduced by turning off first softAP 130 when the primary and secondary earphones are in the standby state (e.g., in a state not receiving the audio data).

Figure 2D:
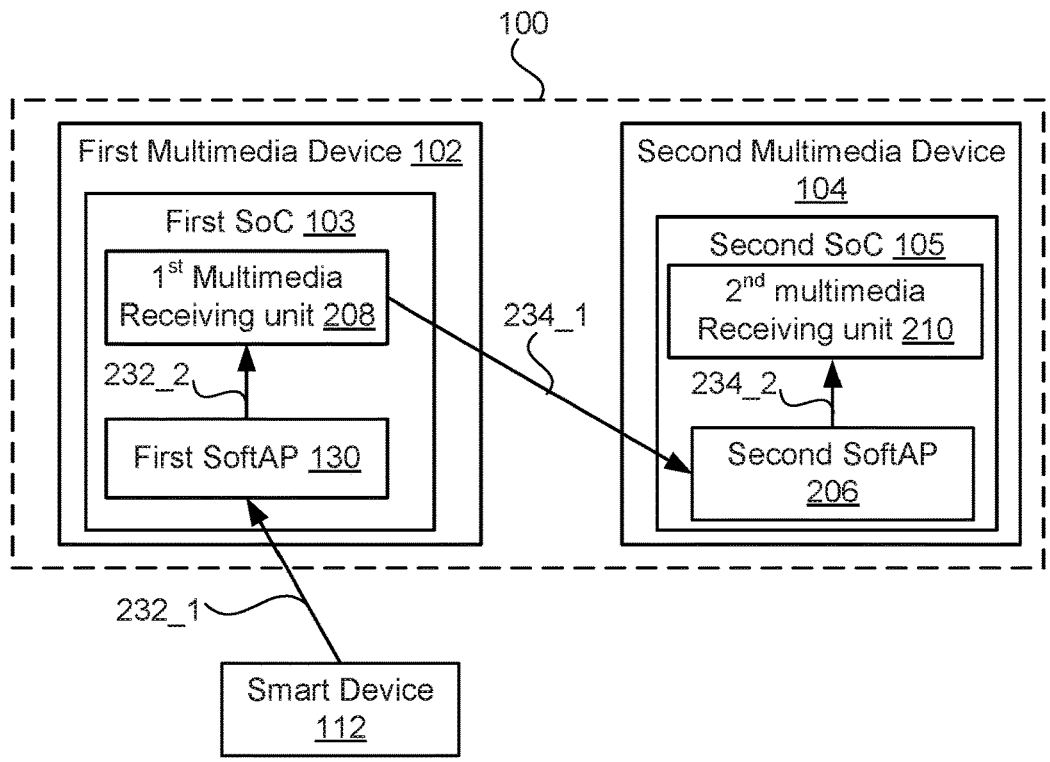
Figure 2E:
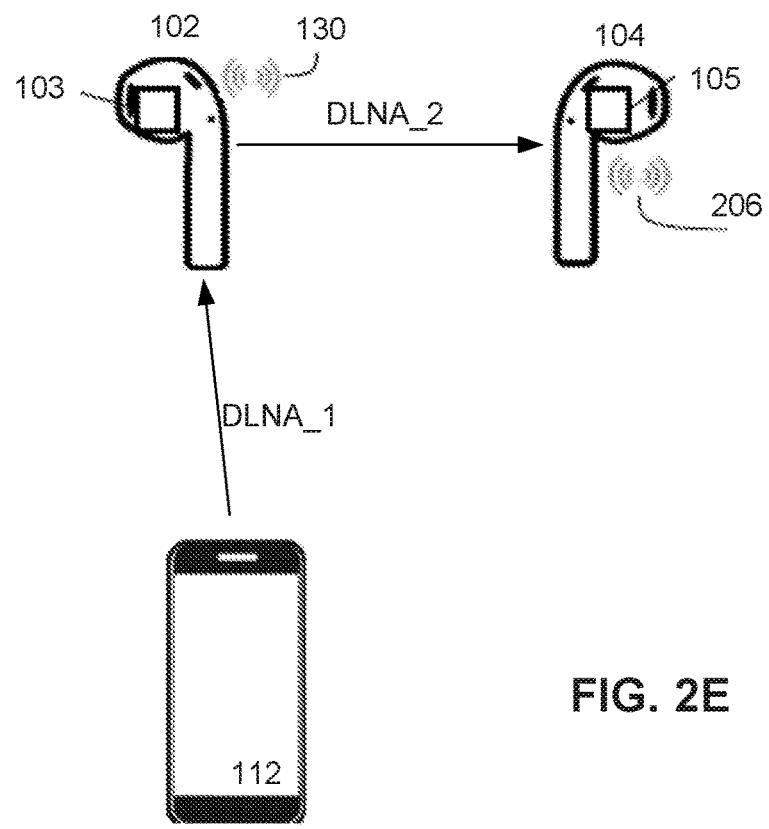

FIGS. 2D-2E illustrate a second exemplary connection way among smart device 112, first multimedia device 102, and second multimedia device 104 under the second mode, according to some aspects of the present disclosure. In the second exemplary connection way, smart device 112 may support the DLNA protocol, and a first one-to-one data transmission from smart device 112 to first multimedia device 102 may be implemented using the DLNA protocol. A second one-to-one data transmission can also be implemented from first multimedia device 102 to second multimedia device 104 using the DLNA protocol. First softAP 130 can be established and turned on in first multimedia device 102 for the first one-to-one data transmission from smart device 112 to first multimedia device 102, whereas a second softAP 206 can be established and turned on for the second one-to-one data transmission from first multimedia device 102 to second multimedia device 104. In some implementations, second softAP 206 can be implemented in second SoC 105 of second multimedia device 104. Alternatively, second softAP 206 can be implemented in first SoC 103 of first multimedia device 102. Alternatively, first softAP 130 and second softAP 206 can be integrated into a single softAP.

For example, with reference to FIGS. 2D-2E, first SoC 103 may establish and turn on first softAP 130 when router 108 is unavailable. A first connection "DLNA_1" under the DLNA protocol can be established between smart device 112 and first multimedia device 102 via first softAP 130. The first connection "DLNA_1" may include (a) a first sub-connection 232_1 from smart device 112 to first softAP 130 and (b) a second sub-connection 232_2 from first softAP 130 to first multimedia receiving unit 208 of first SoC 103. First SoC 103 may receive the multimedia data from smart device 112 using the first sub-connection 232_1, and forward the multimedia data from first softAP 130 to first multimedia receiving unit 208 using the second sub-connection 232_2.

Second SoC 105 may establish and turn on second softAP 206 when router 108 is unavailable. A second connection "DLNA_2" under the DLNA protocol can be established between first multimedia device 102 and second multimedia device 104 via second softAP 206. The second connection "DLNA_2" may include (a) a first sub-connection 234_1 from first multimedia receiving unit 208 of first SoC 103 to second softAP 206 and (b) a second sub-connection 234_2 from second softAP 206 to second multimedia receiving unit 210. Second SoC 105 may receive the multimedia data from first multimedia receiving unit 208 of first SoC 103 using the first sub-connection 234_1, and forward the multimedia data from second softAP 206 to second multimedia receiving unit 210 using the second sub-connection 234_2.

Figure 2F:
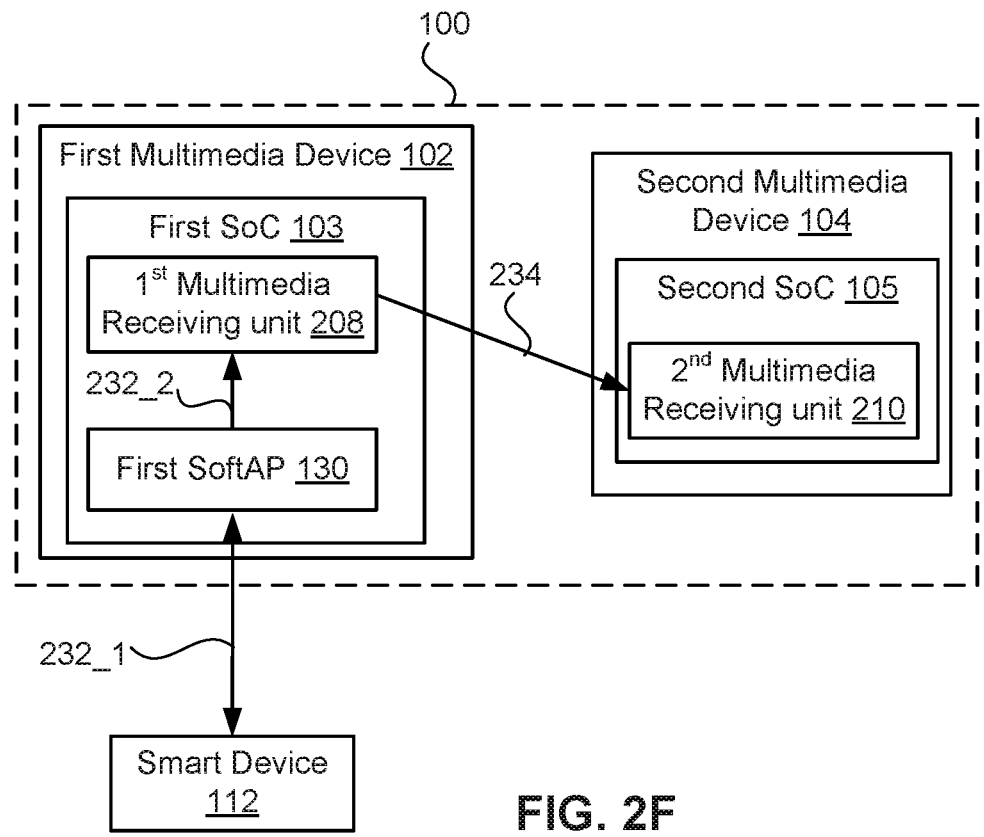
Figure 2G:
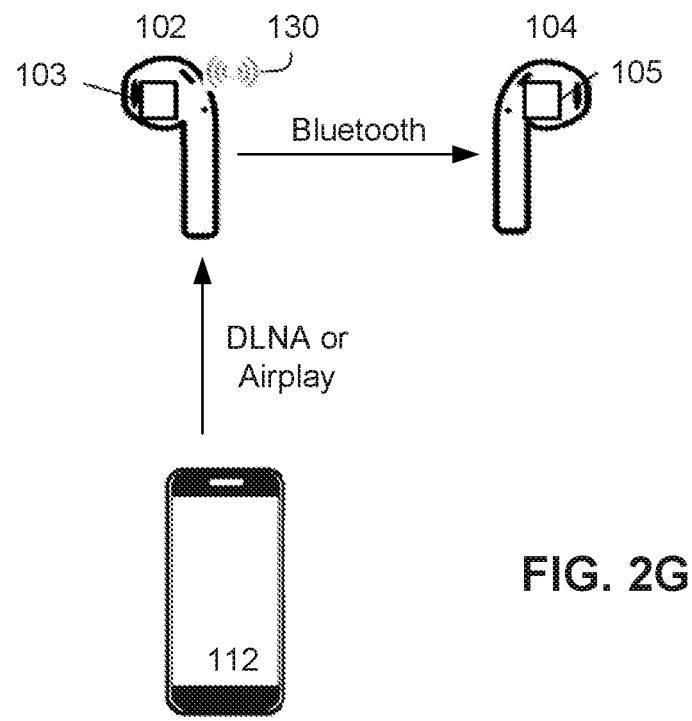

FIGS. 2F-2G illustrate a third exemplary connection way among smart device 112, first multimedia device 102, and second multimedia device 104 under the second mode, according to some aspects of the present disclosure. In the third exemplary connection way, smart device 112 may support the DLNA protocol, and a one-to-one data transmission can be implemented from smart device 112 to first multimedia device 102 via first softAP 130 using the DLNA protocol. A different communication protocol, such as a Bluetooth protocol (e.g., a conventional Bluetooth protocol, a modified version of the conventional Bluetooth protocol, or a low energy (LE) audio protocol, etc.) or a near field communication (NFC) protocol may be applied to implement data transmission from first multimedia device 102 to second multimedia device 104. As a result, the multimedia data from smart device 112 can be shared with first and second multimedia devices 102, 104. That is, even if smart device 112 can only share the multimedia data with one multimedia device under the DLNA protocol, the multimedia data can also be shared with one or more other multimedia devices using a different communication protocol between the multimedia devices.

By using a different communication protocol between first multimedia device 102 and second multimedia device 104 (which does not depend on any wireless LAN), only first softAP 130 is needed to be turned on to achieve the data sharing among smart device 112, first multimedia device 102, and second multimedia device 104. For example, when compared with FIGS. 2D-2E, there is no need to establish a second softAP in FIGS. 2F-2G. By reducing the number of softAPs to be turned on, the risk of privacy exposure can be reduced, and the power consumption of first and second multimedia devices 102, 104 can also be reduced.

For example, with reference to FIGS. 2F-2G, first SoC 103 may establish and turn on first softAP 130 when router 108 is unavailable. A first connection "DLNA" or "airplay" under the DLNA protocol or the airplay protocol can be established between smart device 112 and first multimedia device 102 via first softAP 130. The first connection may include (a) a first sub-connection 232_1 from smart device 112 to first softAP 130 and (b) a second sub-connection 232_2 from first softAP 130 to first multimedia receiving unit 208 of first SoC 103. First SoC 103 may receive the multimedia data from smart device 112 using the first sub-connection 232_1, and forward the multimedia data from first softAP 130 to first multimedia receiving unit 208 using the second sub-connection 232_2. A second connection "Bluetooth" 234 under the Bluetooth protocol can be established between first multimedia device 102 and second multimedia device 104. Second multimedia receiving unit 210 of second SoC 105 may receive the multimedia data from first multimedia receiving unit 208 of first SoC 103 using the second connection "Bluetooth" 234. It is contemplated that the second connection can also be a low energy audio connection. Generally, the Bluetooth connection or the low energy audio connection can be used to share a large amount of data between two devices, whereas the BLE connection can be used to share a small amount of data between the two devices.

In some implementations, when wireless multimedia apparatus 100 only includes first multimedia device 102 (e.g., one primary speaker) and second multimedia device 104 (e.g., one secondary speaker), a one-to-one Bluetooth communication using a conventional Bluetooth protocol can be implemented between first and second multimedia devices 102, 104. A symbol rate of a physical layer of the conventional Bluetooth protocol may be 1 Mb/s. However, the physical layer of the conventional Bluetooth protocol can be modified to form a modified Bluetooth protocol, so that the symbol rate of the physical layer may reach n Mb/s, where n represents an integer greater than or equal to 2. A modulation approach in the modified Bluetooth protocol may include quadrature phase shift keying (QPSK), Gaussian frequency shift keying (GFSK), or quadrature amplitude modulation (QAM). In some implementations, other layers of the modified Bluetooth protocol (which are above the physical layer) can be like other layers of the conventional Bluetooth protocol, respectively. Compared with a WiFi-based communication mode (e.g., the DLNA communication mode, the airplay communication mode), the modified Bluetooth communication mode can reduce transmission power consumption. Compared with the conventional Bluetooth communication mode, the modified Bluetooth communication mode may have a higher transmission capacity to transmit the multimedia data with a higher data rate.

Figure 3A:
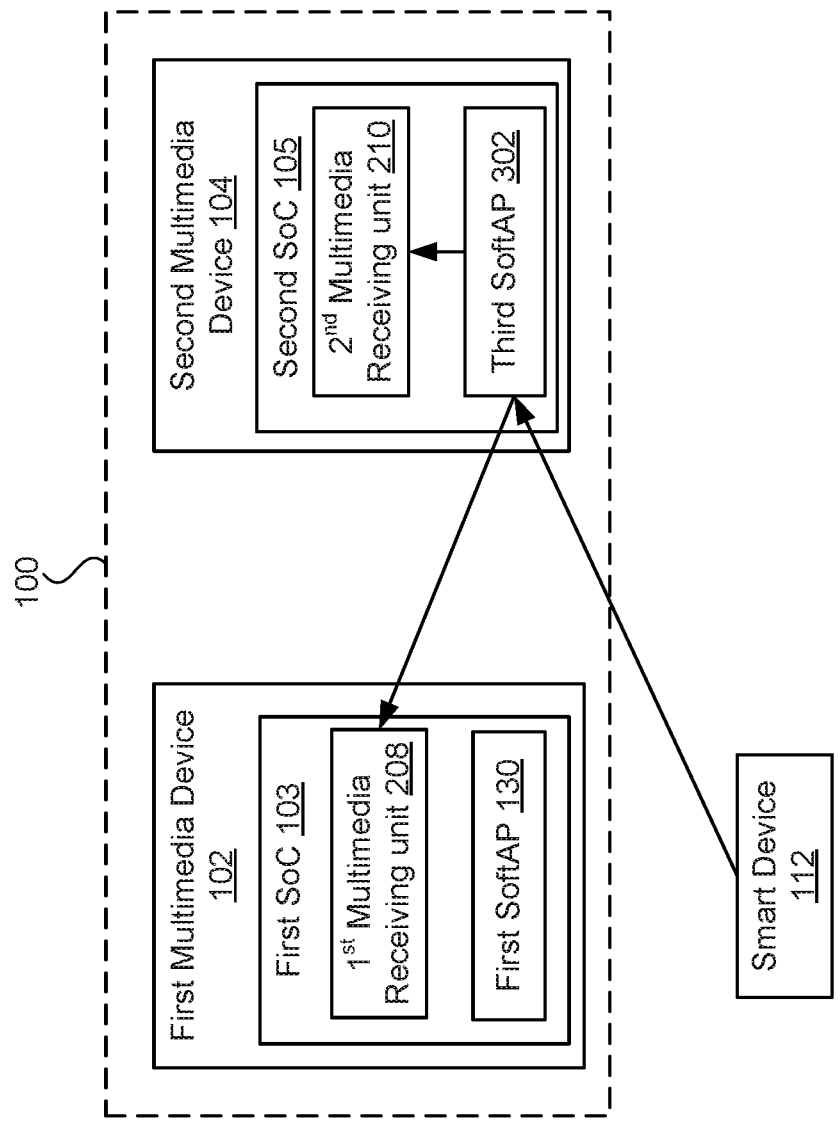
FIGS. 3A-3C illustrate block diagrams of exemplary primary-secondary switching between multimedia devices in a wireless multimedia apparatus under a second mode, according to some aspects of the present disclosure.
Figure 3B:
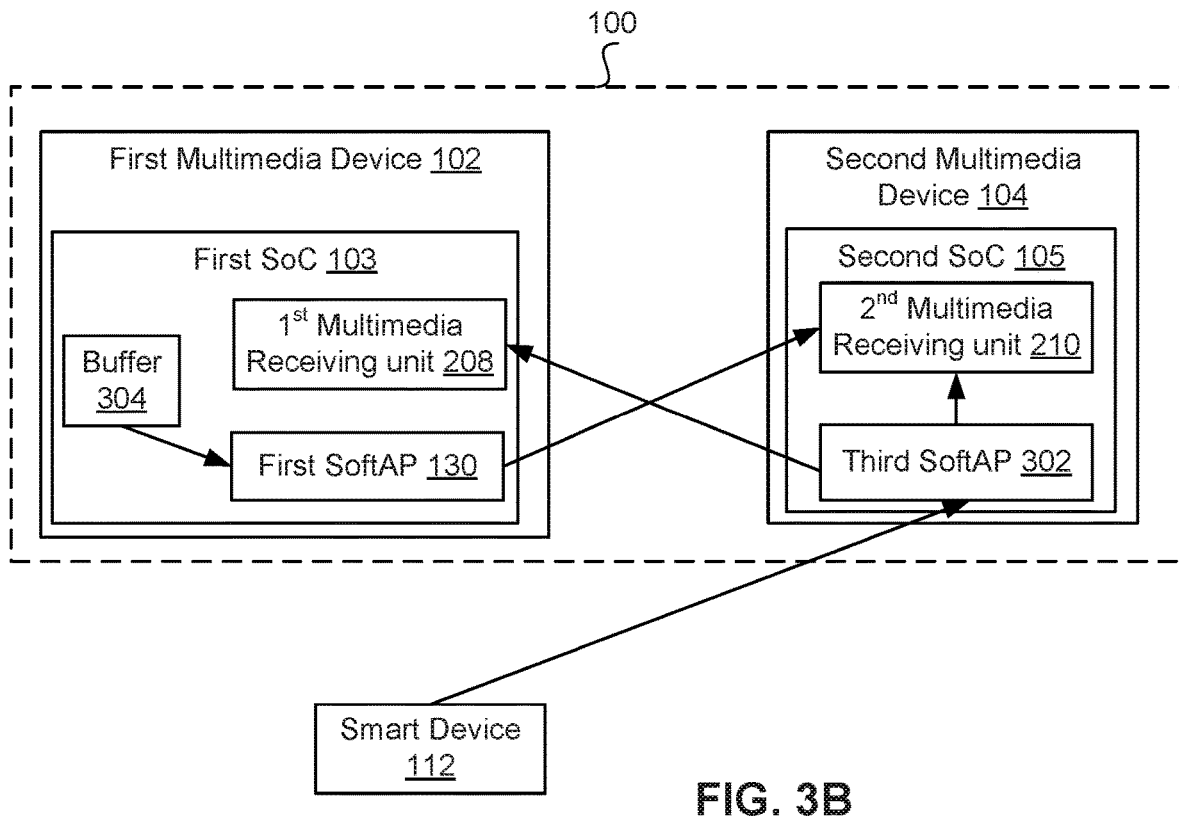
Figure 3C:
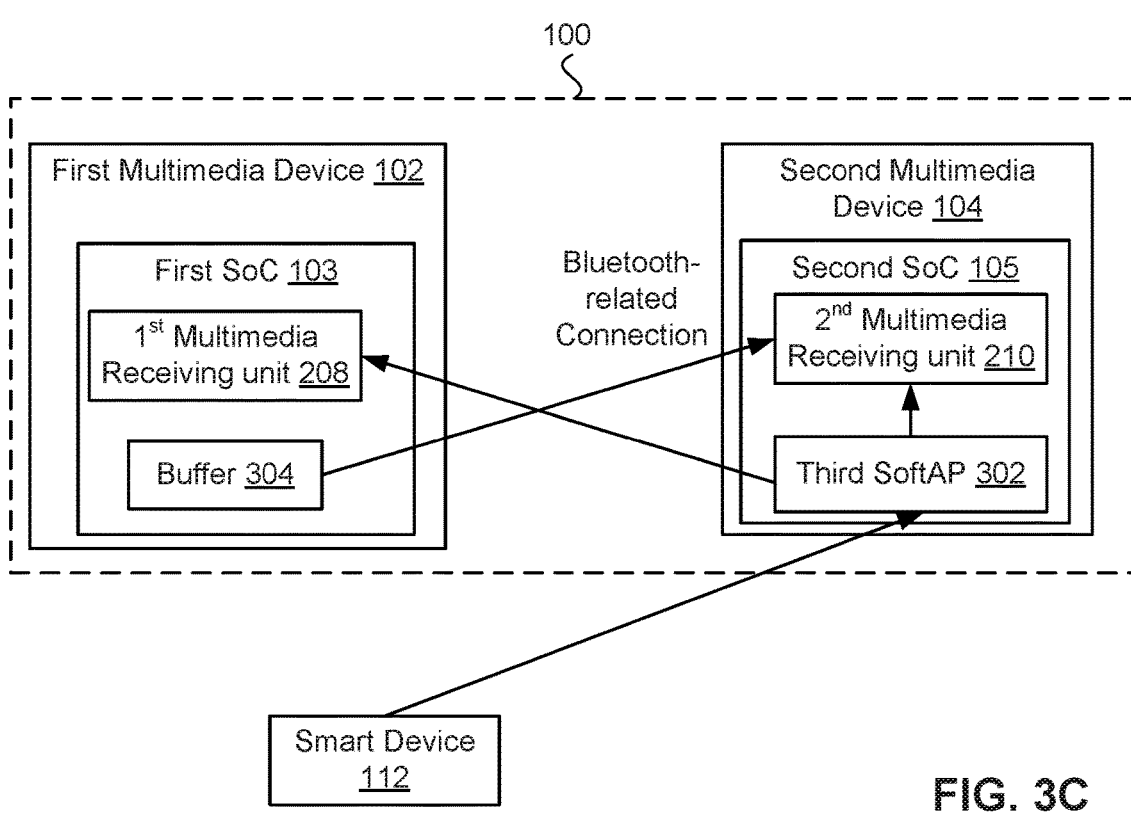

FIGS. 3A-3C illustrate block diagrams of exemplary primary-secondary switching between first and second multimedia devices 102, 104 in wireless multimedia apparatus 100 under a second mode, according to some aspects of the present disclosure. As described above with reference to FIGS. 1A-2G, first multimedia device 102 may act as a primary multimedia device to receive multimedia data from smart device 112 via first softAP 130 responsive to router 108 being unavailable, and second multimedia device 104 may act as a secondary multimedia device to receive the multimedia data from first multimedia device 102. First SoC 103 of first multimedia device 102 may further detect whether a primary-secondary switching condition is satisfied between first and second multimedia devices 102, 104.

For example, as the primary multimedia device, first multimedia device 102 not only needs to receive the multimedia data from smart device 112 via first softAP 130, but also needs to transmit the multimedia data to second multimedia device 104 via a relay of first softAP 130 (e.g., as shown in FIGS. 2A-2C) or via a new connection between first and second multimedia devices 102, 104 (e.g., as shown in FIGS. 2D-2G). Since the power consumed by a multimedia device during a data transmitting process is greater than that during a data receiving process, first multimedia device 102 is likely to consume more power than second multimedia device 104, such that a power level of first multimedia device 102 can be much lower than that of second multimedia device 104. Then, first SoC 103 may detect that the primary-secondary switching condition is satisfied if at least one of the following conditions is satisfied: (a) a current power level of first multimedia device 102 is lower than a first power threshold; (b) a ratio between the current power level and a total power level of first multimedia device 102 is lower than a first ratio threshold; (c) a difference between a current power level of second multimedia device 104 and the current power level of first multimedia device 102 is greater than a second power threshold; or (d) a ratio between the current power level of first multimedia device 102 and the current power level of second multimedia device 104 is lower than a second ratio threshold.

Responsive to the primary-secondary switching condition being satisfied, first SoC 103 may switch second multimedia device 104 to act as the primary multimedia device, and switch first multimedia device 102 to act as the secondary multimedia device. For example, first SoC 103 may transmit the configuration information of router 108 to second SoC 105 through a wireless connection (e.g., a Bluetooth connection) between first and second multimedia devices 102, 104. If the configuration information of router 108 is already stored in second multimedia device 104, then first SoC 103 does not need to transmit the configuration information to second multimedia device 104. First SoC 103 may inform second SoC 105 to establish and turn on a third softAP 302 based on the configuration information of router 108, so that the multimedia data can be shared from smart device 112 to first and second multimedia devices 102, 104 via third softAP 302, which is described below in more detail.

Referring to FIG. 3A, responsive to second multimedia device 104 being switched to act as the primary multimedia device, second SoC 105 may establish third softAP 302 based on the configuration information associated with router 108 and connect to smart device 112 via third softAP 302. Second SoC 105 may receive the multimedia data from smart device 112 via third softAP 302 under the first communication protocol. Second SoC 105 may transmit the multimedia data to first SoC 103. For example, first SoC 103 may stop receiving the multimedia data from smart device 112 via first softAP 130, and start to receive the multimedia data from second multimedia device 104.

In an example like that shown in FIGS. 2A-2C, third softAP 302 can act as a relay point for relaying the multimedia data received from smart device 112 to a plurality of multimedia devices including, but not limited to, first and second multimedia devices 102, 104. For example, when router 108 is unavailable and second SoC 105 acts as the primary multimedia device, second SoC 105 may create (or turn on) third softAP 302 and connect to smart device 112 via third softAP 302. Second SoC 105 may receive the multimedia data from smart device 112 via third softAP 302, and forward the multimedia data to second multimedia receiving unit 210 for storage. Further, first SoC 103 may also receive the multimedia data from smart device 112 through a relay of third softAP 302, and forward the multimedia data to first multimedia receiving unit 208 for storage. In this case, a customized DLNA protocol or an airplay protocol can be used to implement the communication among smart device 112, first multimedia device 102, and second multimedia device 104 under the second mode.

In another example like that shown in FIGS. 2D-2E, responsive to router 108 being unavailable and second SoC 105 being switched to act as the primary multimedia device, a first connection under the first communication protocol can be established between smart device 112 and second multimedia device 104 via third softAP 302. A second connection can be established between first multimedia device 102 and second multimedia device 104 via a fourth softAP (not shown in the figure) created in first multimedia device 102 under the first communication protocol. The first and second connections can be DLNA connections. Then, second multimedia receiving unit 210 of second multimedia device 104 may receive the multimedia data from smart device 112 via third softAP 302 using the first connection. Using the second connection, first SoC 103 may receive the multimedia data from second multimedia receiving unit 210 of second SoC 105 via the fourth softAP, and forward the multimedia data from the fourth softAP to first multimedia receiving unit 208.

In yet another example like that shown in FIGS. 2F-2G, responsive to router 108 being unavailable and second SoC 105 being switched to act as the primary multimedia device, a first connection under the first communication protocol can be established between smart device 112 and second multimedia device 104 via third softAP 302. A second connection can be established between first multimedia device 102 and second multimedia device 104 under a second communication protocol. For example, the first connection can be a DLNA connection or an airplay connection. The second connection can be a Bluetooth connection. Then, second multimedia receiving unit 210 of second multimedia device 104 may receive the multimedia data from smart device 112 via third softAP 302 using the first connection. Using the second connection, first multimedia receiving unit 208 of first SoC 103 may receive the multimedia data from second multimedia receiving unit 210 of second SoC 105.

In some implementations, before the primary-secondary switching occurs between first and second multimedia devices 102, 104, first multimedia device 102 may receive the multimedia data from smart device 112 via first softAP 130, and play at least a first portion of the multimedia data (e.g., audio data of a left channel) on a speaker of first multimedia device 102. First multimedia device 102 may save at least a second portion of the multimedia data (e.g., audio data of a right channel) in a buffer of first SoC 103, so that the second portion of the multimedia data stored in the buffer can be sent to second multimedia device 104. In this case, even if first multimedia device 102 stops receiving the multimedia data from smart device 112 via first softAP 130 when third softAP 302 is turned on, first multimedia device 102 may still have a portion of the multimedia data stored in the buffer and not transmitted to second multimedia device 104 yet (also referred to as a buffered portion of the multimedia data).

Thus, even if (a) first multimedia device 102 stops receiving the multimedia data from smart device 112 via first softAP 130 and (b) second multimedia device 104 starts to receive the multimedia data from smart device 112 via third softAP 302, first SoC 103 may continue to transmit the buffered portion of the multimedia data to second multimedia device 104 until the transmission of this buffered portion of the multimedia data completes. Thus, the impact of the primary-secondary switching on the wireless transmission performance of the multimedia data can be reduced (e.g., interruption on the playing of the multimedia data on first and second multimedia devices 102, 104 can be avoided).

For example, with reference to FIG. 3B, first SoC 103 may include a buffer 304 for storing at least a portion of the multimedia data received via first softAP 130. Buffer 304 may be part of first multimedia receiving unit 208 or a component separate from first multimedia receiving unit 208. When (a) first multimedia device 102 stops receiving the multimedia data from smart device 112 via first softAP 130 and (b) second multimedia device 104 starts to receive the multimedia data from smart device 112 via third softAP 302, first SoC 103 may continue to transmit the buffered portion of the multimedia data stored in buffer 304 to second multimedia device 104 until the transmission of the buffered portion of the multimedia data completes. First SoC 103 may turn off first softAP 130 when the transmission of the buffered portion of the multimedia data completes.

In another example, with reference to FIG. 3C, when (a) first multimedia device 102 stops receiving the multimedia data from smart device 112 via first softAP 130 and (b) second multimedia device 104 starts to receive the multimedia data from smart device 112 via third softAP 302, first SoC 103 may turn off first softAP 130. In this case, first SoC 103 may transmit the buffered portion of the multimedia data stored in buffer 304 to second multimedia device 104 via a Bluetooth-related connection between first multimedia device 102 and second multimedia device 104. The Bluetooth-related connection can be a BLE, LE audio, or classic Bluetooth connection, etc. By turning off first softAP 130 and transmitting the buffered portion of the multimedia data to second multimedia device 104 via the Bluetooth-related connection, the power consumption of first multimedia device 102 and second multimedia device 104 can be reduced, and the battery usage time of first multimedia device 102 and second multimedia device 104 can be prolonged.

With combined reference to FIGS. 3A-3C, although third softAP 302 may replace first softAP 130 after the primary-secondary switching, smart device 112 may only sense the presence of only one softAP and consider itself to exchange the multimedia data via only one softAP since both first softAP 130 and third softAP 302 are established using the same configuration information of router 108. Thus, smart device 112 can be a general device that is capable of interacting with router 108 or a softAP established using the configuration information of router 108. The primary-secondary switching disclosed herein does not incur any software or hardware upgrade (or, software or hardware correction) on smart device 112, which facilitates the implementations of the present disclosure provided herein.

FIG. 4 illustrates a block diagram of a structure of an exemplary multimedia device 400, according to some aspects of the present disclosure. Multimedia device 400 may include an SoC 401, a sensor 410, a speaker 412, and a microphone 414, etc. First multimedia device 102 (or second multimedia device 104) disclosed herein may have a structure like that of multimedia device 400. First SoC 103 (or second SoC 105) disclosed herein may have a structure like that of SoC 401. SoC 401 may include a processor 402, a memory 404, a WiFi communication module 406, a Bluetooth-related communication module 408, and a multimedia receiving unit 409.

Processor 402 may include any appropriate type of microprocessor, central processing unit (CPU), graphics processing unit (GPU), digital signal processor, or microcontroller suitable for audio processing. Processor 402 may include one or more hardware units (e.g., portion(s) of an integrated circuit) designed for use with other components or to execute part of a program. The program may be stored on a computer-readable medium, and when executed by processor 402, it may perform one or more functions disclosed herein. Processor 402 may be a complex instruction set computing (CISC) microprocessor, a reduced instruction set computing (RISC) microprocessor, a very long instruction word (VLIW) microprocessor, a processor executing any other type of instruction sets, or a processor that executes a combination of different instruction sets. In some implementations, processor 402 may be a special-purpose processor rather than a general-purpose processor. Processor 402 may include one or more special-purpose processing devices, such as application-specific integrated circuits (ASICs), field programmable gate arrays (FPGAs), digital signal processors (DSPs), systems on a chip (SoCs), and the like.

The present disclosure is not limited to any type of processor or processor circuit, as long as the processor or processor circuit can be configured for performing the functions disclosed herein. Additionally, the term "processor" disclosed herein may include more than one processor, e.g., a processor with multiple cores or multiple processors, each of which has a multi-core design.

Memory 404 may include any appropriate type of mass storage provided to store any type of information that processor 402 may need to operate. For example, memory 404 may be a volatile or non-volatile, magnetic, semiconductor-based, tape-based, optical, removable, non-removable, or other types of storage device or tangible (i.e., non-transitory) computer-readable medium including, but not limited to, a Read-Only Memory (ROM), a flash memory, a dynamic Random Access Memory (RAM), and a static RAM. Memory 404 may be configured to store one or more computer programs that may be executed by processor 402 to perform functions disclosed herein. Memory 404 may be further configured to store information and data used by processor 402.

WiFi communication module 406 may be configured to implement a WiFi communication with other devices (e.g., smart device 112, or another multimedia device). For example, SoC 401 may additionally include a mobile chip (not shown in FIG. 4). WiFi communication module 406 may convert a mobile network signal of the mobile chip into a wireless signal by creating a softAP. For example, a 4G network signal can be converted into a wireless signal through the softAP.

Bluetooth-related communication module 408 may be configured to implement a Bluetooth-based communication with another device (e.g., smart device 112, or another multimedia device). In some implementations, smart device 112 may also include a corresponding Bluetooth-related communication module. By utilizing the corresponding Bluetooth-related communication module of smart device 112 and Bluetooth-related communication module 408 of multimedia device 400, a continuous monitoring of a data transmission status of smart device 112 can be achieved in real time or near real time with low power consumption. For example, SoC 401 can be configured to continuously communicate with smart device 112 via a Bluetooth-related communication to learn a data transmission status of smart device 112. The data transmission status may indicate whether smart device 112 has multimedia data to send to multimedia device 400. If smart device 112 has multimedia data to send to multimedia device 400 and no router is available, SoC 401 may create (or turn on) a softAP for receiving the multimedia data from smart device 112. Bluetooth-related communication can be, for example, a communication based on the classic Bluetooth protocol, the BLE protocol, or the low energy audio protocol, or any other modified Bluetooth protocol.

In a further example, smart device 112 may send an instruction to multimedia device 400 via the Bluetooth-related communication when a user launches a multimedia playback application or clicks on a music file on smart device 112. The instruction may indicate that smart device 112 has multimedia data to send to multimedia device 400 for replay. Responsive to receiving the instruction from smart device 112 and no router being available, SoC 401 may turn on the softAP for receiving the multimedia data from smart device 112. In this case, the softAP can be promptly turned on when there is multimedia data to be played by multimedia device 400 and no router is available, so that smooth transmission of the multimedia data can be achieved. On the other hand, the softAP may not be turned on if smart device 112 has no multimedia data to send to multimedia device 400. Then, multimedia device 400 may keep communicating with smart device 112 via the BLE communication. As a result, the power consumption of multimedia device 400 can be reduced when multimedia device 400 is in a standby status (e.g., when multimedia device 400 does not need to receive any multimedia data). The risk of privacy exposure caused by the turned-on softAP can be reduced. For example, smart device 112 may stop pushing the multimedia data to multimedia device 400 via the softAP after multimedia device 400 plays the multimedia data for a period of time. Then, multimedia device 400 may switch to communicate with smart device 112 using the BLE communication and turn off the softAP to save power consumption and reduce the risk of privacy exposure.

In some implementations, multimedia receiving unit 409 may be configured to store multimedia data received from the softAP created by SoC 401. In some other implementations, multimedia receiving unit 409 may be configured to store multimedia data received from the Bluetooth communication. Multimedia receiving unit 409 may include one or more buffers for storing the multimedia data.

It is noted that various components of SoC 401 can be implemented using commercially-available or self-developed modules, such as processor 402, memory 404, communication modules 406, 408, codecs, buffers, or the like. Other components of multimedia device 400, such as an antenna, sensor 410, microphone 414, or speaker 412 can be externally connected to SoC 401. SoC 401 may be made by, for example, building an ASIC based on the commercially-available or self-developed modules to reduce power consumption and cost. Alternatively, a user can also use FPGA to implement the various communication modules, codecs, etc., of SoC 401. It is contemplated that buffers (not shown in FIG. 4) can also be equipped with the various modules, codecs, etc., of SoC 401 to temporarily store the data generated during processing.

Figure 5:
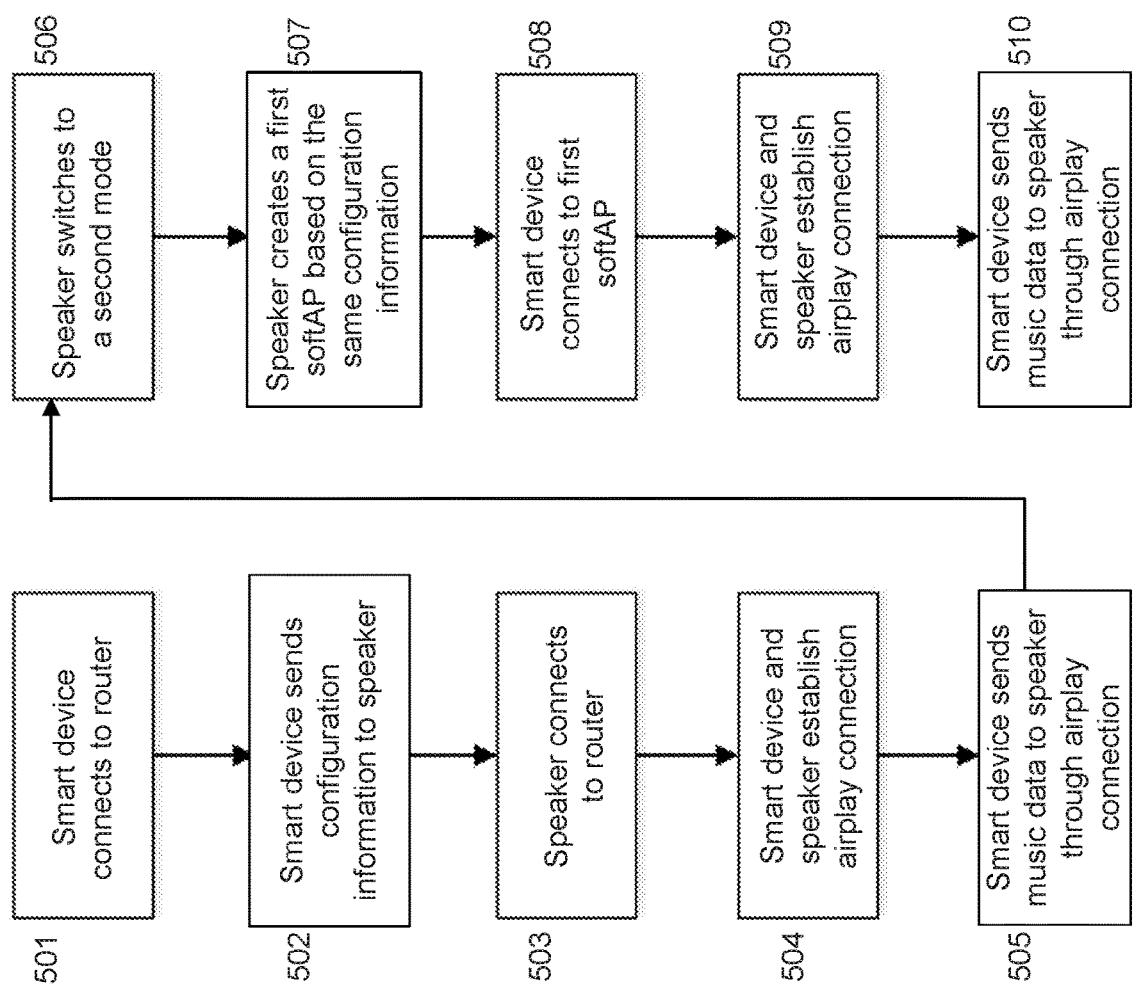
FIG. 5 illustrates an exemplary operation process performed in a wireless multimedia system, according to some aspects of the present disclosure.

FIG. 5 illustrates an exemplary operation process performed in a wireless multimedia system (e.g., wireless multimedia system of FIGS. 1A-2G), according to some aspects of the present disclosure. Without loss of generality, smart device 112 is used as an example of multimedia provider 109, a set of speakers is used as an example of wireless multimedia apparatus 100 in the wireless multimedia system, and the airplay protocol is used as an example of the first communication protocol. The wireless multimedia system (or the set of speakers) of FIG. 5 may be dynamically switched between the first mode and the second mode. For example, the first mode may include operations 501-505, and the second mode may include operations 506-510.

In operation 501, smart device 112 may connect to a router (e.g., router 108), which is used to form a wireless LAN on which the airplay protocol depends. In operation 502, smart device 112 may send configuration information of the router to the set of speakers through the web access control (WAC) protocol, the Bluetooth protocol, or a customized approach, which is not limited herein. This operation may be referred to as a network configuration (or distribution) process of smart device 112 to the set of speakers. In operation 503, the set of speakers may use the configuration information received in operation 502 to connect to the router. After connecting to the router, smart device 112 and the set of speakers may establish an airplay connection with each other in operation 504. In operation 505, smart device 112 may send music data to the set of speakers through the airplay connection, so that the music data may be played by the set of speakers. For example, smart device 112 may send the music data to the router, and then the router may send the music data to the set of speakers.

In operation 506, when the router becomes unavailable (e.g., the set of speakers moves to a new environment without the router), the set of speakers may change from the first mode to the second mode. At this point, the set of speakers may no longer try to connect to the router. In operation 507, the set of speakers may create a first softAP using the same configuration information of the router obtained in operation 502. For example, smart device 112 may fail to connect to the router, and may inform the set of speakers that the router is unavailable via a Bluetooth connection. Then, the set of speakers may create and turn on the first softAP based on the configuration information of the router. In another example, the first softAP may be created in advance and turned off when the router is available. When smart device 112 fails to connect to the router, the first softAP may be turned on.

In operation 508, smart device 112 may connect to the first softAP created by the set of speakers. Since smart device 112 has been connected to the router with the same configuration in operation 501, smart device 112 can automatically connect to the first softAP created by the set of speakers, without requiring the user to manually input the network configuration information. In operation 509, smart device 112 and the set of speakers establish a new airplay connection based on the first softAP. In operation 510, smart device 112 may send the music data to the set of speakers through the new airplay connection, so that the music data may be played by the set of speakers.

Figure 6:
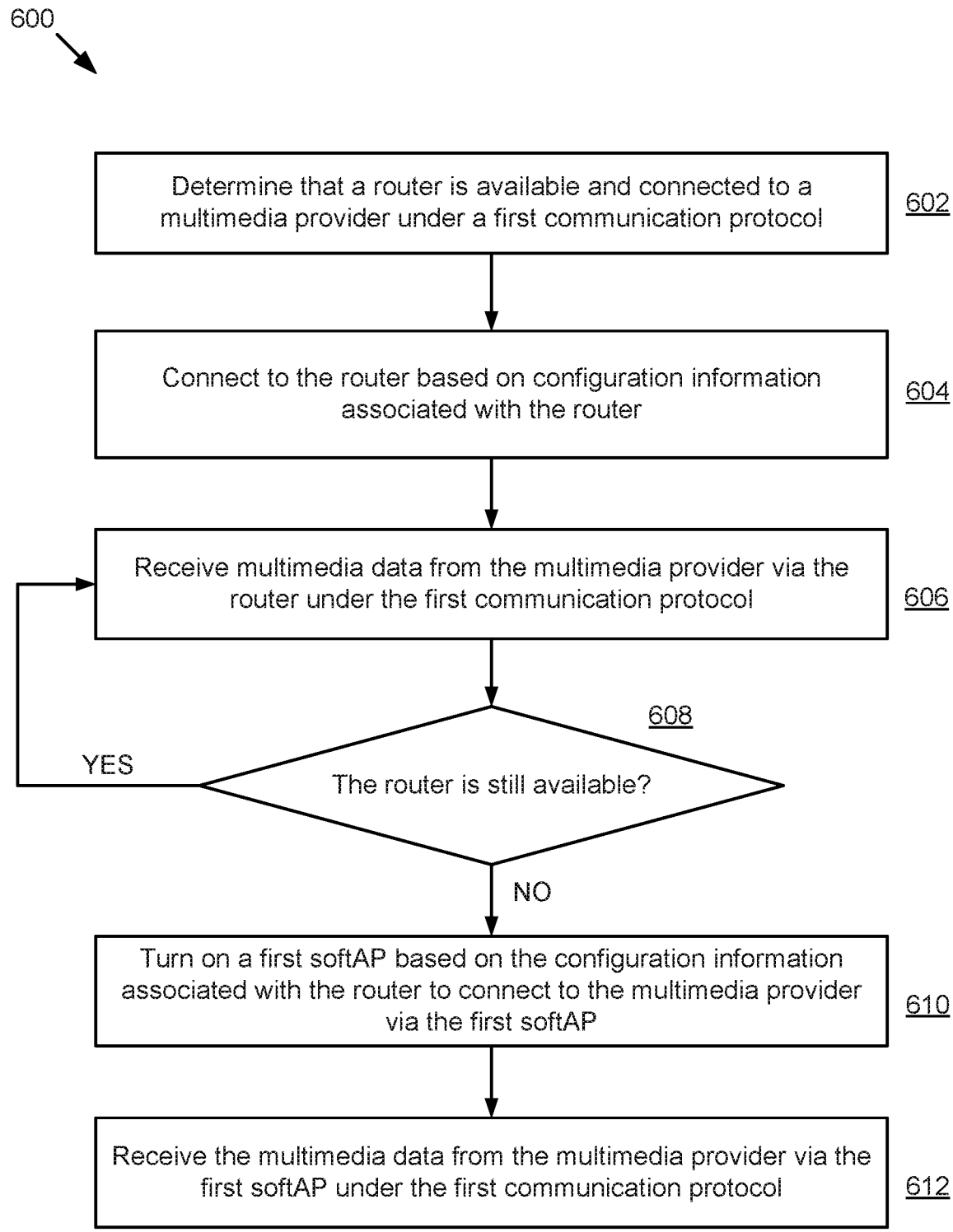
FIG. 6 illustrates a flowchart of an exemplary wireless communication method of a wireless multimedia apparatus, according to some aspects of the present disclosure.

FIG. 6 illustrates a flowchart of an exemplary wireless communication method 600 of a wireless multimedia apparatus (e.g., wireless multimedia apparatus 100), according to some aspects of the present disclosure. For example, the wireless multimedia apparatus may include a first multimedia device with a first SoC (which acts as a primary multimedia device) and a second multimedia device with a second SoC (which acts as a secondary multimedia device). Method 600 may be implemented by the first SoC (e.g., a processor of the first SoC). It is understood that the operations shown in method 600 may not be exhaustive and that other operations can be performed as well before, after, or between any of the illustrated operations. Further, some of the operations may be performed simultaneously, or in a different order than shown in FIG. 6.

Referring to FIG. 6, method 600 starts at operation 602, in which the first SoC determines that a router is available and connected to a multimedia provider under a first communication protocol.

Method 600 proceeds to operation 604, as illustrated in FIG. 6, in which the first SoC connects to the router based on configuration information associated with the router.

Method 600 proceeds to operation 606, as illustrated in FIG. 6, in which the first SoC receives multimedia data from the multimedia provider via the router under the first communication protocol.

Method 600 proceeds to operation 608, as illustrated in FIG. 6, in which the first SoC determines whether the router is still available. Responsive to the router being available, method 600 may return to operation 606. Otherwise, method 600 may proceed to operation 610.

In operation 610, as illustrated in FIG. 6, the first SoC turns on a first softAP based on the configuration information associated with the router to connect to the multimedia provider via the first softAP.

Method 600 proceeds to operation 612, as illustrated in FIG. 6, in which the first SoC receives the multimedia data from the multimedia provider via the first softAP under the first communication protocol.

Figure 7A:
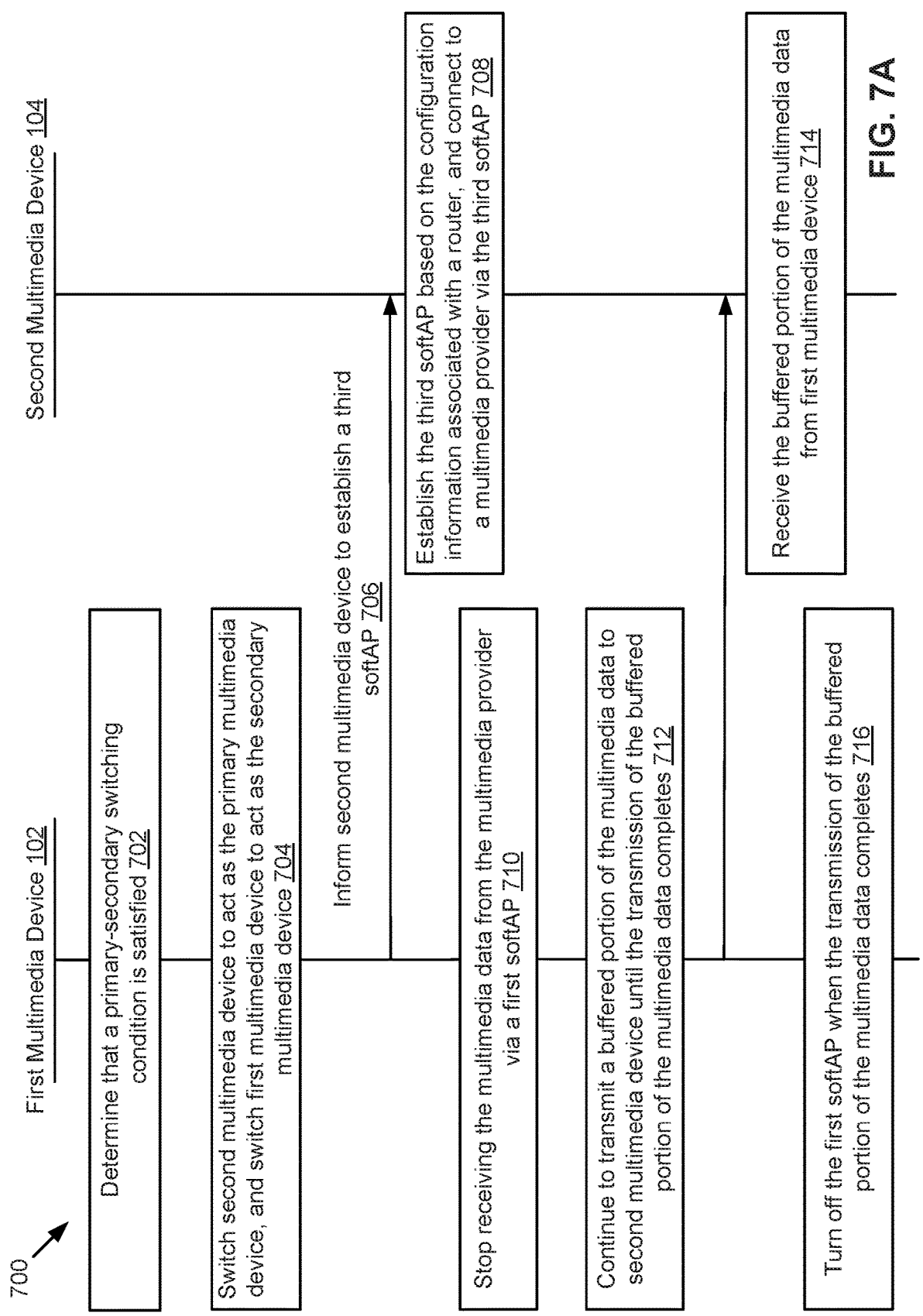
FIGS. 7A-7B illustrate an exemplary primary-secondary switching process between multimedia devices in a wireless multimedia apparatus under a second mode, according to some aspects of the present disclosure.
Figure 7B:
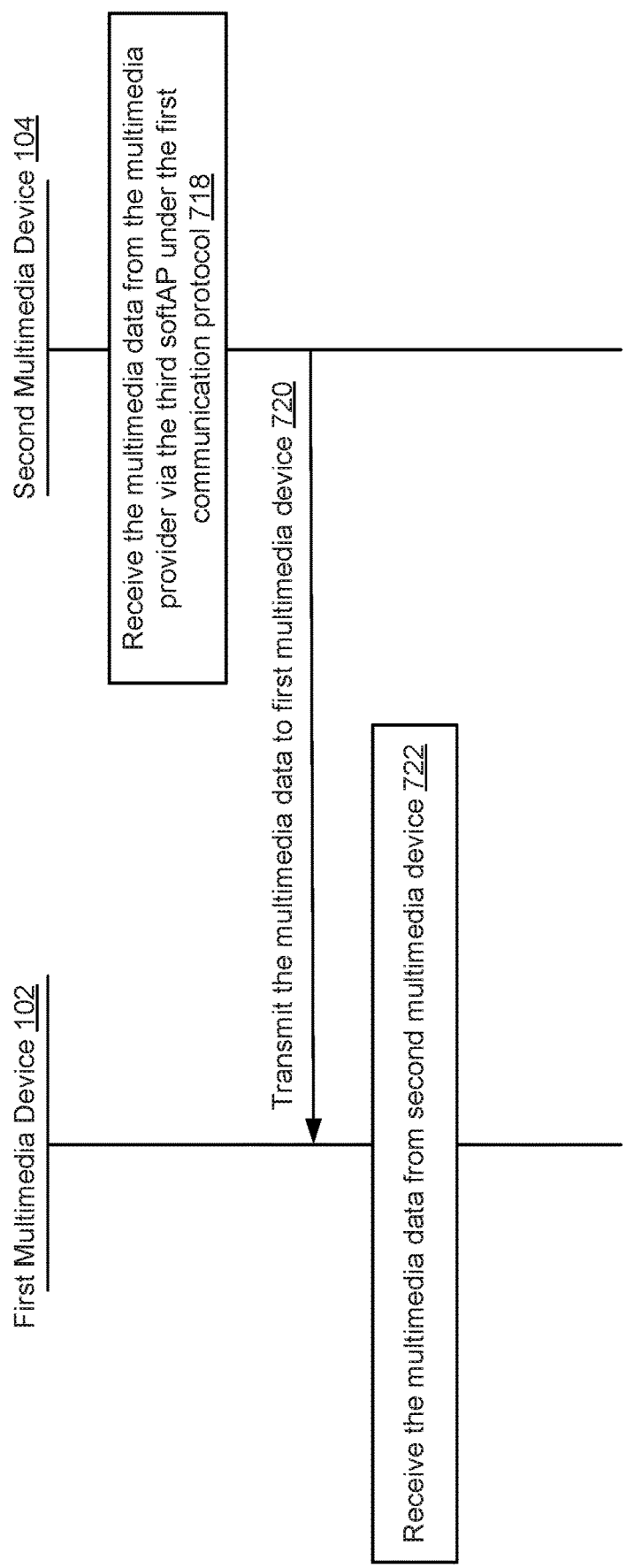

FIGS. 7A-7B illustrate an exemplary process 700 of primary-secondary switching performed in wireless multimedia apparatus 100 under a second mode, according to some aspects of the present disclosure. Process 700 may be implemented by first SoC 103 of first multimedia device 102 (e.g., a processor of first SoC 103) and/or second SoC 105 of second multimedia device 104 (e.g., a processor of second SoC 105). It is understood that the operations shown in process 700 may not be exhaustive and that other operations can be performed as well before, after, or between any of the illustrated operations. Further, some of the operations may be performed simultaneously, or in a different order than shown in FIGS. 7A-7B.

Initially, first multimedia device 102 and second multimedia device 104 may act as a primary multimedia device and a secondary multimedia device, respectively. Then, process 700 may be performed to switch second multimedia device 104 to act as the primary multimedia device and to switch first multimedia device 102 to act as the secondary multimedia device.

Referring to FIG. 7A, process 700 starts at operation 702, in which first SoC 103 of first multimedia device 102 may determine that a primary-secondary switching condition is satisfied.

Process 700 proceeds to operation 704, as illustrated in FIG. 7A, in which first SoC 103 may switch second multimedia device 104 to act as the primary multimedia device, and switch first multimedia device 102 to act as the secondary multimedia device.

Process 700 proceeds to operation 706, as illustrated in FIG. 7A, in which responsive to determining that a router (e.g., router 108) is unavailable, first SoC 103 may inform second multimedia device 104 to establish a third softAP (e.g., third softAP 302).

Process 700 proceeds to operation 708, as illustrated in FIG. 7A, in which second SoC 105 may establish the third softAP based on the configuration information associated with the router (e.g., router 108), and connect to the multimedia provider via the third softAP.

Process 700 proceeds to operation 710, as illustrated in FIG. 7A, in which first SoC 103 may stop receiving the multimedia data from the multimedia provider via a first softAP (e.g., first softAP 130) established on first multimedia device 102 previously.

Process 700 proceeds to operation 712, as illustrated in FIG. 7A, in which first SoC 103 may continue to transmit a buffered portion of the multimedia data to second multimedia device 104 until the transmission of the buffered portion of the multimedia data completes.

Process 700 proceeds to operation 714, as illustrated in FIG. 7A, in which second SoC 105 may receive the buffered portion of the multimedia data from first multimedia device 102.

Process 700 proceeds to operation 716, as illustrated in FIG. 7A, in which first SoC 103 may turn off the first softAP when the transmission of the buffered portion of the multimedia data completes.

Process 700 proceeds to operation 718, as illustrated in FIG. 7B, in which second SoC 105 may receive the multimedia data from the multimedia provider via the third softAP under a first communication protocol.

Process 700 proceeds to operation 720, as illustrated in FIG. 7B, in which second SoC 105 may transmit the multimedia data to first multimedia device 102.

Process 700 proceeds to operation 722, as illustrated in FIG. 7B, in which first SoC 103 may receive the multimedia data from second multimedia device 104. For example, first SoC 103 may receive the multimedia data from second multimedia device 104 via a relay of the third softAP. In another example, first SoC 103 may receive the multimedia data from second multimedia device 104 via a Bluetooth connection between first and second multimedia devices 102, 104.

Figure 8:
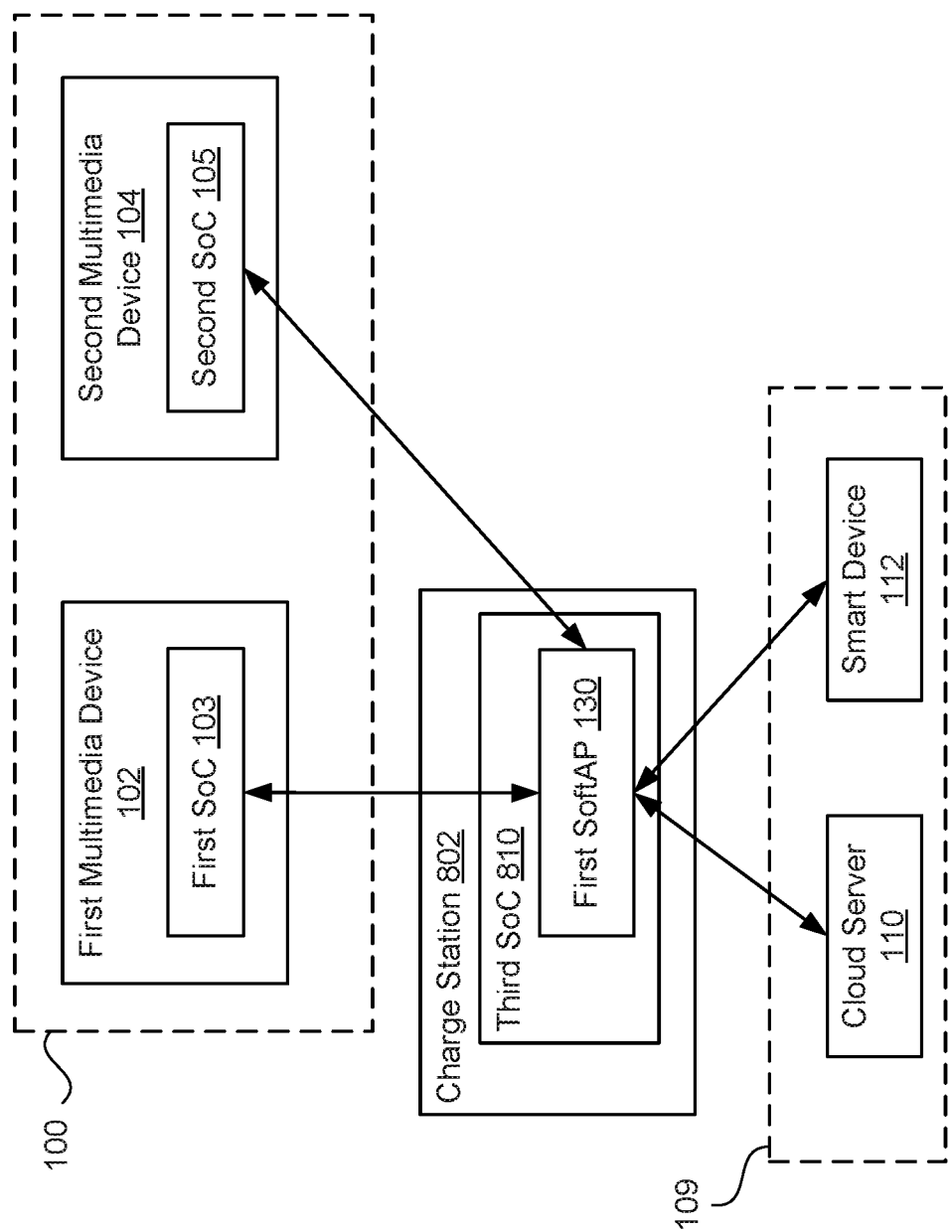
FIG. 8 illustrates a block diagram of another exemplary wireless multimedia system under a second mode, according to some aspects of the present disclosure.
Figure 9:
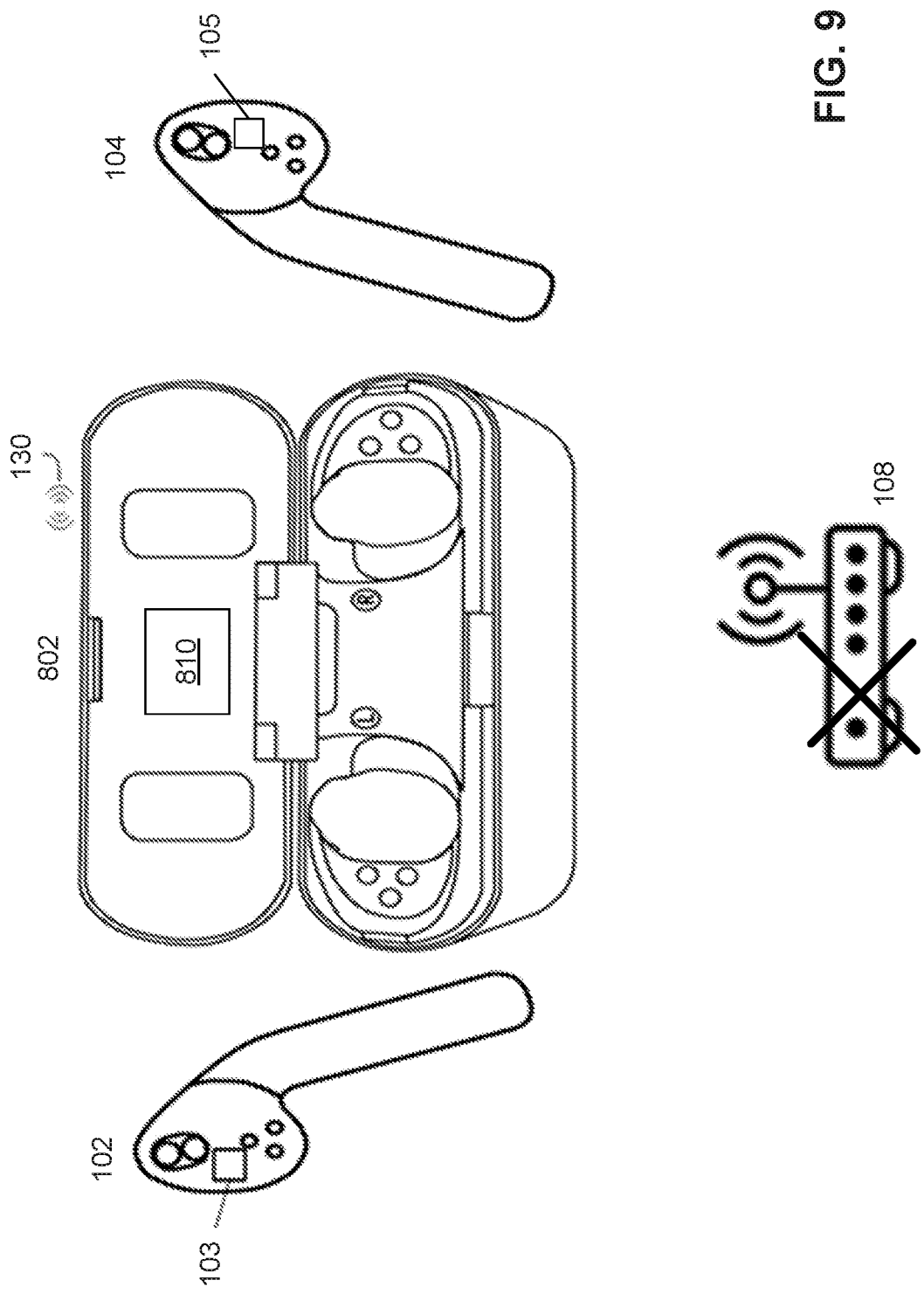
FIG. 9 is a graphical representation illustrating an exemplary charge station and an exemplary wireless multimedia apparatus under a second mode, according to some aspects of the present disclosure.

FIG. 8 illustrates a block diagram of another exemplary wireless multimedia system under a second mode, according to some aspects of the present disclosure. The wireless multimedia system of FIG. 8 may have components like those of FIG. 1C, and the similar description will not be repeated herein. For example, the wireless multimedia system of FIG. 8 may include wireless multimedia apparatus 100, smart device 112, or cloud server 110, etc., like those shown in FIG. 1C. The wireless multimedia system of FIG. 8 may additionally include a charge station 802 configured for charging wireless multimedia apparatus 100. Charge station 802 may include a third SoC 810. FIG. 9 is a graphical representation illustrating charge station 802 (e.g., a charge box) and wireless multimedia apparatus 100 (e.g., a pair of earphones) under the second mode, according to some aspects of the present disclosure. FIGS. 8 and 9 are described herein together.

Compared with the wireless multimedia system of FIGS. 1A-1B, router 108 is unavailable in the wireless multimedia system of FIGS. 8-9. Under the second mode, first softAP 130 can be created (or turned on) in third SoC 810 of charge station 802 (rather than in first SoC 103 of first multimedia device 102 as shown in FIG. 1C) to save power consumption in first multimedia device 102. For example, responsive to determining that router 108 being unavailable, third SoC 810 may establish (or turn on) first softAP 130 based on the configuration information associated with router 108, connect to multimedia provider 109 (e.g., smart device 112) via first softAP 130, and receive the multimedia data from smart device 112 via first softAP 130 under the first communication protocol.

In some implementations, first multimedia device 102 may communicate with charge station 802 via a BLE connection, and may inform charge station 802 about the availability of router 108 via the BLE connection. Alternatively or additionally, charge station 802 may dynamically monitor the availability of router 108. Charge station 802 may determine whether to create (or turn on) first softAP 130 based on the availability of router 108. For example, charge station 802 may only turn on first softAP 130 when router 108 is unavailable.

In some implementations, third SoC 810 may detect whether first multimedia device 102 and second multimedia device 104 are in charge station 802. Responsive to detecting that both of first multimedia device 102 and second multimedia device 104 are in charge station 802, third SoC 810 may turn off first softAP 130. In this case, first multimedia device 102 and second multimedia device 104 may be in a charging state in charge station 802, and there is no need to turn on first softAP 130 for multimedia data sharing. Or, responsive to detecting that at least one of first multimedia device 102 or second multimedia device 104 is out of charge station 802 and router 108 is unavailable, third SoC 810 may turn on first softAP 130.

In some implementations, first SoC 103 may detect whether at least one of first multimedia device 102 or second multimedia device 104 is in an ear of the user (e.g., whether at least one of a left earphone or a right earphone is in the ear of the user). Then, responsive to detecting that both first multimedia device 102 and second multimedia device 104 are not in the ears of the user, first SoC 103 may instruct third SoC 810 to turn off first softAP 130 (e.g., via a BLE communication). Or, responsive to detecting that at least one of first multimedia device 102 or second multimedia device 104 is in the ear and router 108 being unavailable, first SoC 103 may instruct third SoC 810 to turn on first softAP 130.

In some implementations, first softAP 130 in third SoC 810 can operate as a relay point for relaying the multimedia data from charge station 802 to first multimedia device 102 and second multimedia device 104. In this case, both first multimedia device 102 and second multimedia device 104 may receive the multimedia data via first softAP 130 from charge station 802. The relay of the multimedia data from charge station 802 to first multimedia device 102 and second multimedia device 104 is described below in more detail with reference to FIG. 10A.

In some other implementations, a first connection under the first communication protocol can be established between smart device 112 and first multimedia device 102 via first softAP 130, where first softAP 130 is located in charge station 802. First multimedia device 102 can be configured to receive the multimedia data from smart device 112 using the first connection. A second connection can be established between charge station 802 and second multimedia device 104, and second multimedia device 104 can be configured to receive the multimedia data from charge station 802 using the second connection. For example, the second connection can be established between charge station 802 and second multimedia device 104 via second softAP 206 created in second multimedia device 104 under the first communication protocol. In this case, the first and second connections can be DLNA connections, as described below in more detail with reference to FIG. 10B. In another example, the second connection can be established between first and second multimedia devices 102, 104 under the first communication protocol (or a second communication protocol). In this case, the first connection can be a first DLNA connection, and the second connection can be a second DLNA connection (or a Bluetooth connection), as described below in more detail with reference to FIG. 10C.

In yet some other implementations, a first connection (e.g., a DLNA or airplay connection) under the first communication protocol can be established between smart device 112 and charge station 802 via first softAP 130. A second connection (e.g., a Bluetooth connection) can be established between charge station 802 and first multimedia device 102. First multimedia device 102 can be configured to receive the multimedia data from charge station 802 using the second connection. A third connection (e.g., a Bluetooth connection) can be established between charge station 802 and second multimedia device 104. Second multimedia device 104 can be configured to receive the multimedia data from charge station 802 using the third connection. An example with the first, second, and third connections is described below in more detail with reference to FIG. 10D.

In still yet some other implementations, a first connection (e.g., a first DLNA connection "DLNA_1") under the first communication protocol can be established between smart device 112 and charge station 802 via first softAP 130, where smart device 112 acts as a digital media controller ("DMC_1") and charge station 802 acts a digital media player ("DMP_1"). Charge station 802 can be configured to receive the multimedia data from smart device 112 using the first connection "DLNA_1." A second connection (e.g., a second DLNA connection "DLNA_2") under the first communication protocol can be established between charge station 802 and first multimedia device 102. A third connection (e.g., a third DLNA connection "DLNA_3") under the first communication protocol can be established between charge station 802 and second multimedia device 104. In this case, charge station 802 also acts as a digital media controller ("DMC_2"), and first and second multimedia devices 102, 104 may act as digital media players ("DMP_2" and "DMP_3"), respectively. First multimedia device 102 can be configured to receive the multimedia data from charge station 802 using the second connection "DLNA_2." Second multimedia device 104 can be configured to receive the multimedia data from charge station 802 using the third connection "DLNA_3."

Figure 10A:
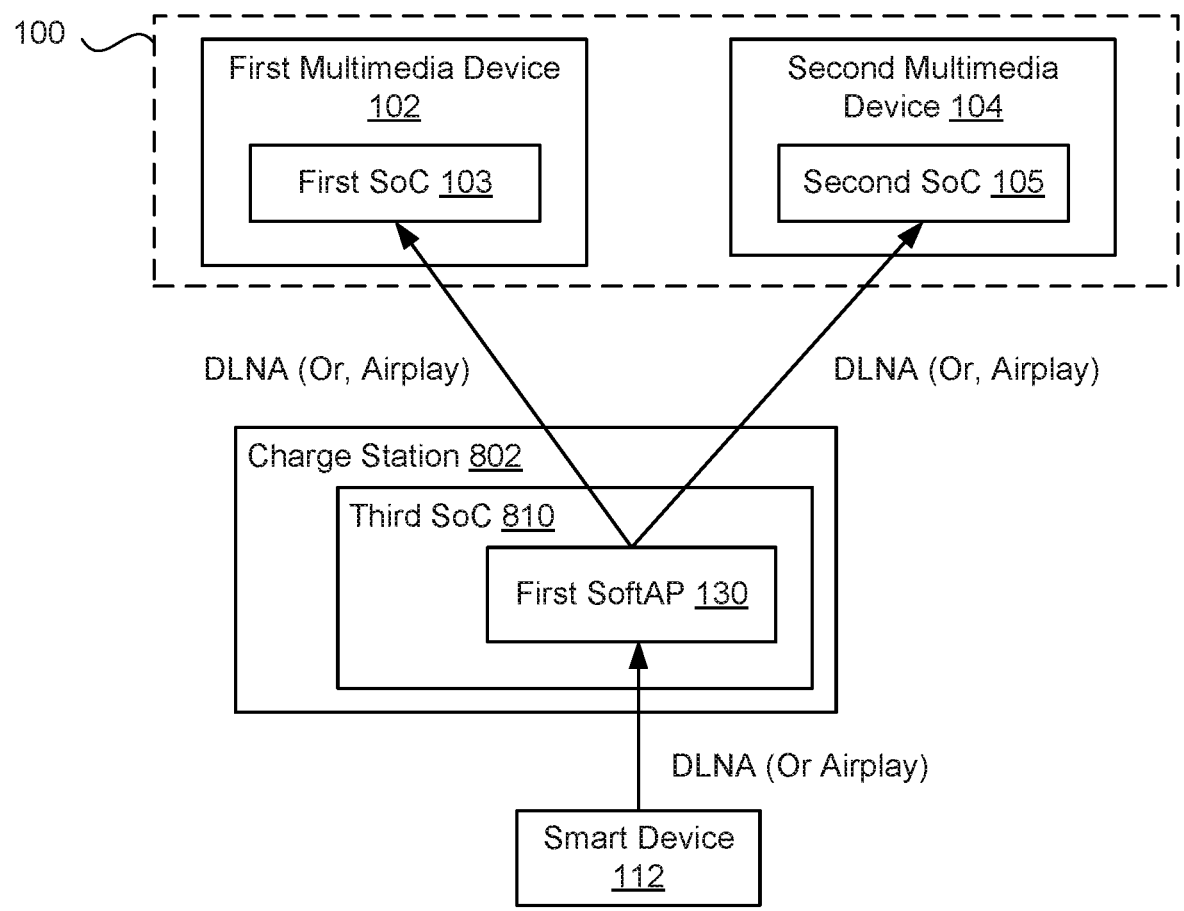
FIGS. 10A-10D illustrate various exemplary connection ways among a smart device, a charge station, and multimedia devices under a second mode, according to some aspects of the present disclosure.

FIG. 10A illustrate a first exemplary connection way among smart device 112, first multimedia device 102, and second multimedia device 104 in the wireless multimedia system of FIG. 8 under the second mode, according to some aspects of the present disclosure. In the first exemplary connection way, first softAP 130 can act as a relay point for relaying the multimedia data received from smart device 112 to a plurality of multimedia devices including, but not limited to, first and second multimedia devices 102, 104. In some implementations, first softAP 130 may be integrated into third SoC 810 of charge station 802.

In some implementations, when router 108 is unavailable, third SoC 810 may create (or turn on) first softAP 130 to connect to smart device 112 via first softAP 130. Third SoC 810 may receive the multimedia data from smart device 112 via first softAP 130, and forward the multimedia data to first SoC 103 and second SoC 105 by using first softAP 130 as a relay point. In this case, a customized DLNA protocol (or an airplay protocol) can be used to implement the communication among smart device 112, charge station 802, first multimedia device 102, and second multimedia device 104 under the second mode.

Figure 10B:
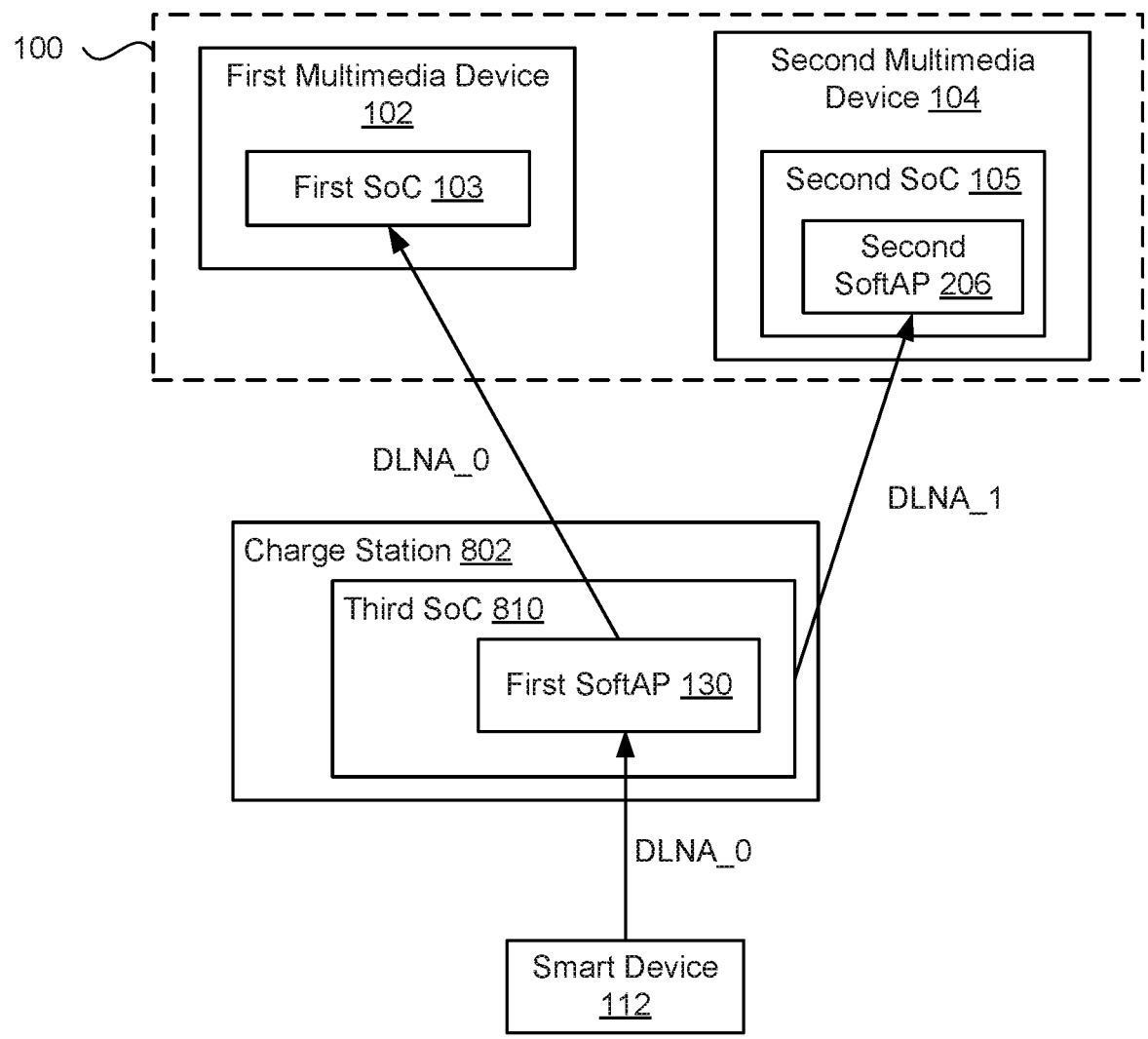

FIG. 10B illustrates a second exemplary connection way among smart device 112, first multimedia device 102, and second multimedia device 104 in the wireless multimedia system of FIG. 8 under the second mode, according to some aspects of the present disclosure. In the second exemplary connection way, smart device 112 may support the DLNA protocol, which is used to implement a first one-to-one data transmission from smart device 112 to first multimedia device 102 via first softAP 130. The same DLNA protocol may also be applied to implement a second one-to-one data transmission from charge station 802 to second multimedia device 104 via second softAP 206. In some implementations, second softAP 206 can be implemented in second SoC 105 of second multimedia device 104. Alternatively, second softAP 206 can be implemented in third SoC 810 of charge station 802. Alternatively, first softAP 130 and second softAP 206 can be integrated into a single softAP in third SoC 810.

Specifically, third SoC 810 may establish (or turn on) first softAP 130 when router 108 is unavailable. A first connection "DLNA_0" under the DLNA protocol can be established between smart device 112 and first multimedia device 102 via first softAP 130 for sharing the multimedia data from smart device 112 to first multimedia device 102 via first softAP 130. Second SoC 105 may establish (or turn on) second softAP 206 when router 108 is unavailable. A second connection "DLNA_1" under the DLNA protocol can be established between charge station 802 and second multimedia device 104 via second softAP 206 for forwarding the multimedia data from charge station 802 to first multimedia device 102 via second softAP 206.

Figure 10C:
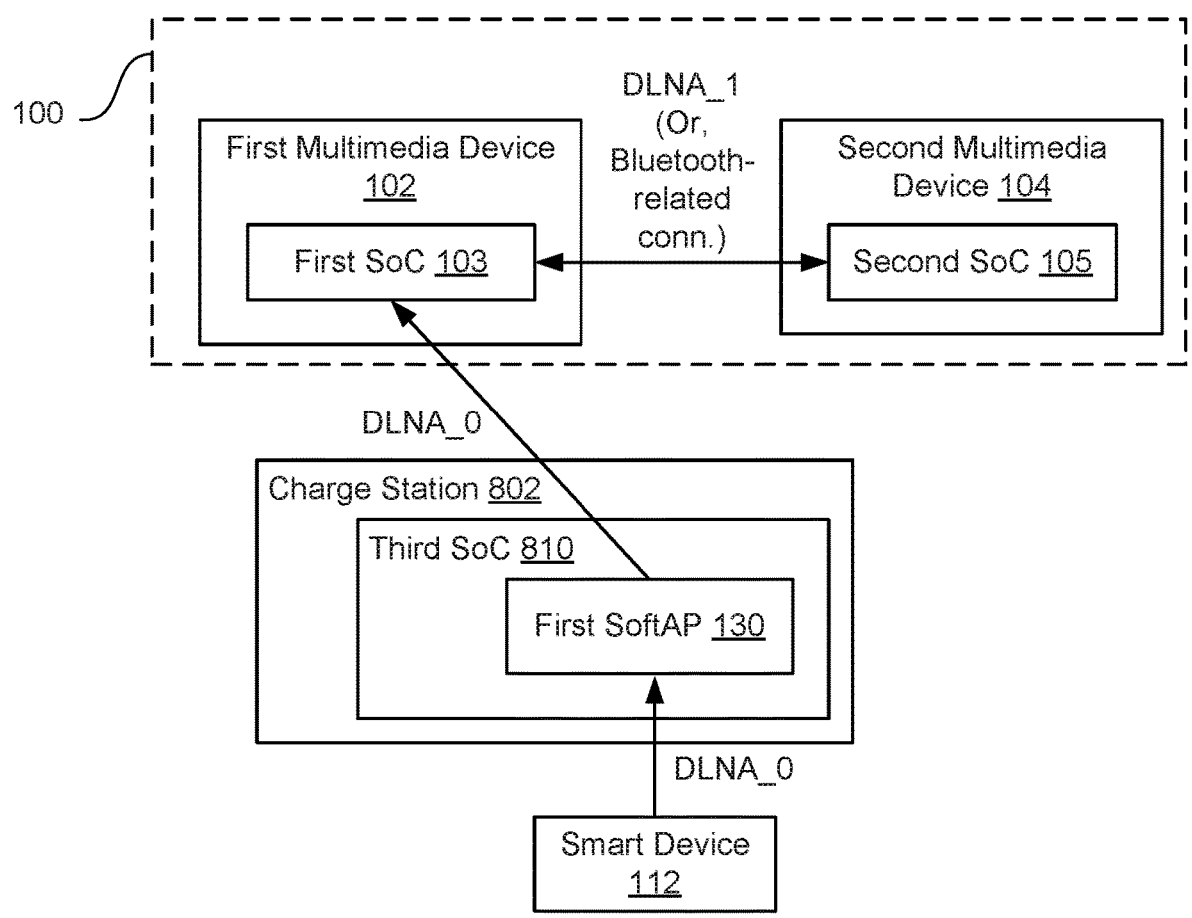

FIG. 10C illustrates a third exemplary connection way among smart device 112, first multimedia device 102, and second multimedia device 104 in the wireless multimedia system of FIG. 8 under the second mode, according to some aspects of the present disclosure. In the third exemplary connection way, smart device 112 may support the DLNA protocol (e.g., a "DLNA_0" connection) to send the multimedia data from smart device 112 to first multimedia device 102 via first softAP 130. A second DLNA connection (e.g., a "DLNA_1" connection) under the DLNA protocol may also be established between first multimedia device 102 and second multimedia device 104 through second softAP 206 established in first multimedia device 102 or second multimedia device 104. Alternatively, a different communication protocol, such as a Bluetooth-related protocol, may be applied to establish a second connection (e.g., a "Bluetooth-related" connection) from first multimedia device 102 to second multimedia device 104. As a result, the multimedia data from smart device 112 can be shared from smart device 112 to first multimedia device 102 via the first connection "DLNA_0." The multimedia data can also be shared from first multimedia device 102 to second multimedia device 104 via the second connection "DLNA_1" or "Bluetooth-related connection." It is noted that the Bluetooth-related connection can be a classic Bluetooth connection, a low energy audio connection, etc., which is not limited herein.

Figure 10D:
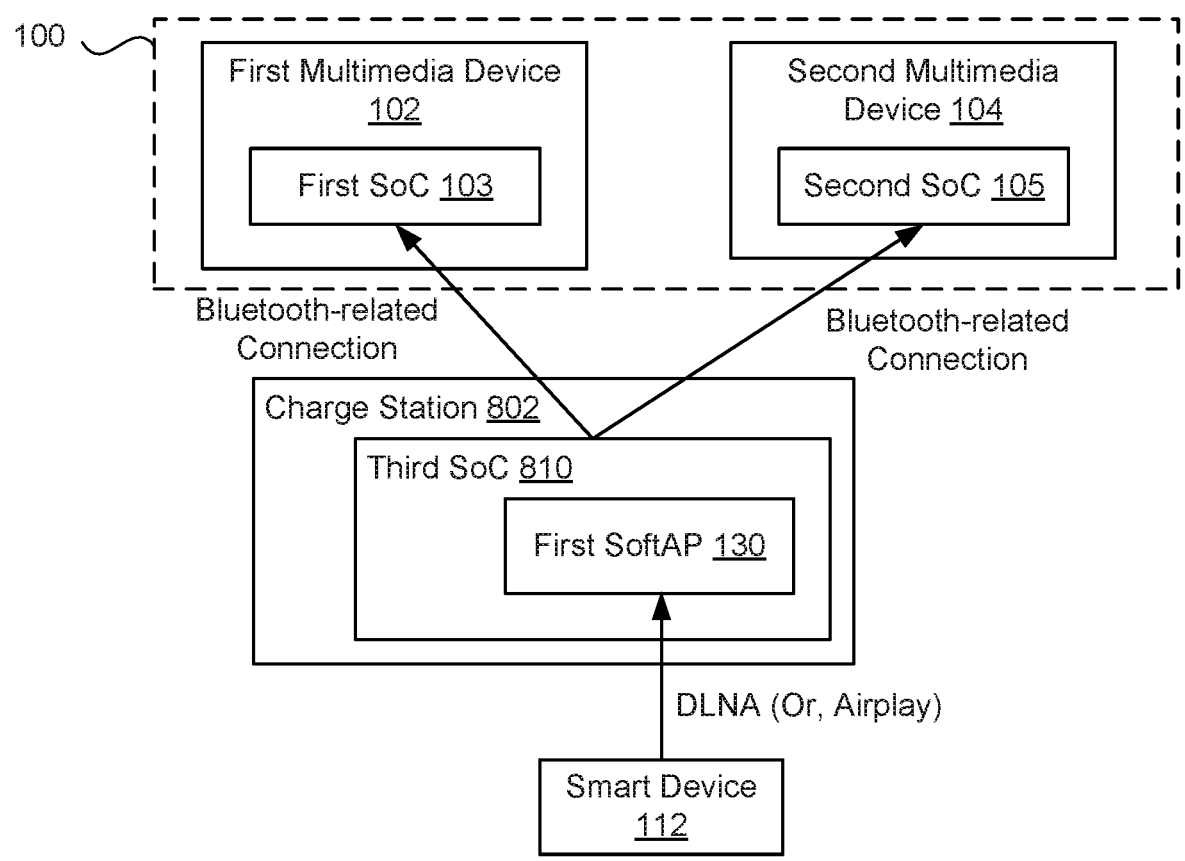

FIG. 10D illustrates a fourth exemplary connection way among smart device 112, first multimedia device 102, and second multimedia device 104 in the wireless multimedia system of FIG. 8 under the second mode, according to some aspects of the present disclosure. In the fourth exemplary connection way, smart device 112 may support the DLNA protocol (or the airplay protocol) to send the multimedia data from smart device 112 to charge station 802 via first softAP 130. A different communication protocol, such as a Bluetooth-related protocol, may be applied to establish Bluetooth-related connections (e.g., a BLE, LE audio, or classic Bluetooth connection) from charge station 802 to first multimedia device 102 and second multimedia device 104, respectively. As a result, the multimedia data from smart device 112 can be shared from smart device 112 to charge station 802 via first softAP 130. The multimedia data can also be shared from charge station 802 to first multimedia device 102 and second multimedia device 104 via the Bluetooth connections, respectively.

Figure 11:
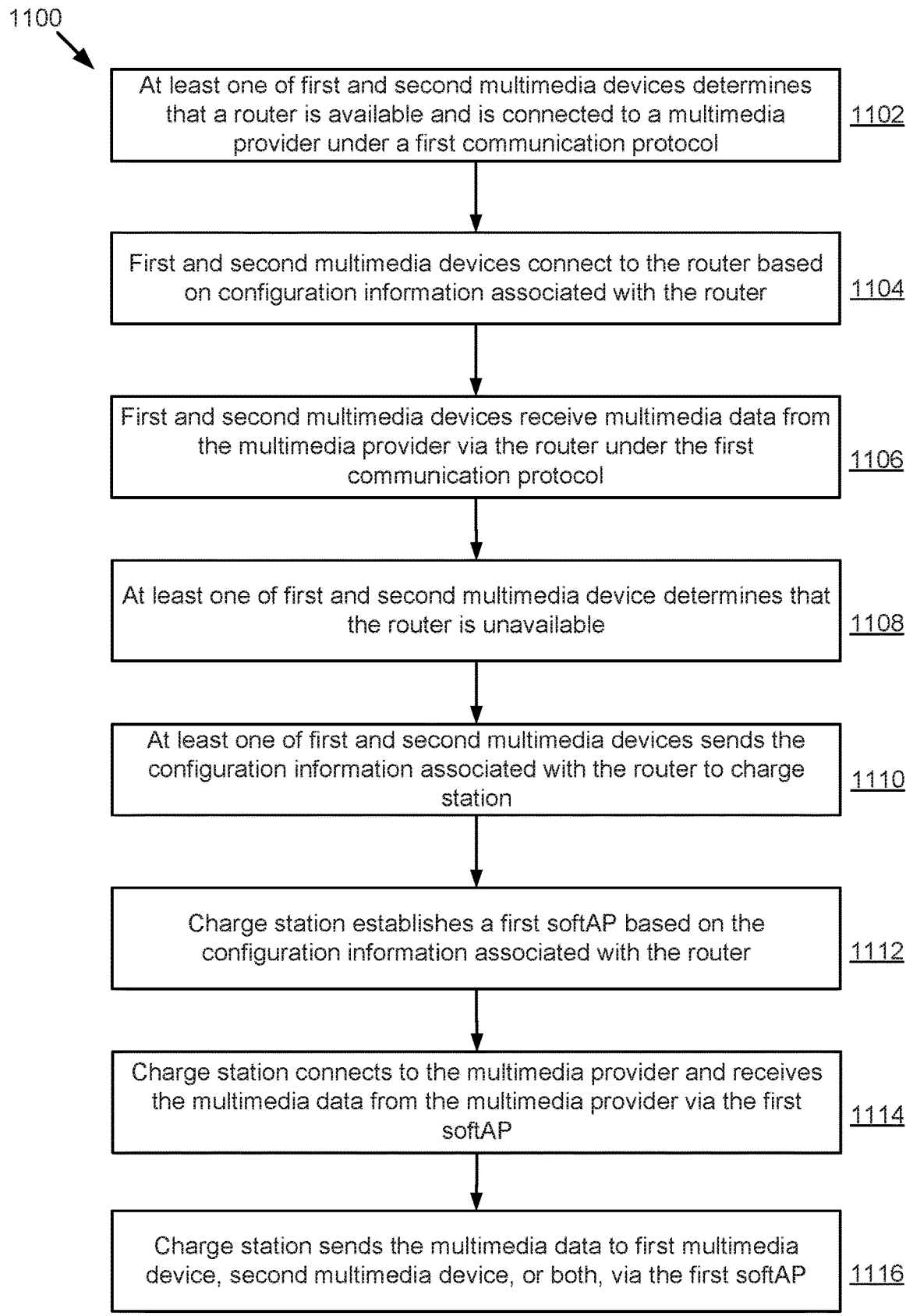
FIG. 11 illustrates another exemplary operation process performed in a wireless multimedia system, according to some aspects of the present disclosure.

FIG. 11 illustrates another exemplary operation process 1100 performed in a wireless multimedia system (e.g., the wireless multimedia system of FIG. 8), according to some aspects of the present disclosure. For example, the wireless multimedia apparatus may include first multimedia device 102) with first SoC 103, second multimedia device 104 with second SoC 105, and charge station 802 with third SoC 810. Process 1100 may be implemented by first SoC 103 (e.g., a processor of first SoC 103), second SoC 105 (e.g., a processor of second SoC 105), and/or third SoC 810 (e.g., a process of third SoC 810). It is understood that the operations shown in process 1100 may not be exhaustive and that other operations can be performed as well before, after, or between any of the illustrated operations. Further, some of the operations may be performed simultaneously, or in a different order than shown in FIG. 11.

Referring to FIG. 11, process 1100 starts at operation 1102, in which at least one of first and second multimedia devices 102, 104 may determine that a router is available and the router is connected to a multimedia provider under a first communication protocol.

Process 1100 proceeds to operation 1104, as illustrated in FIG. 11, in which first and second multimedia devices 102, 104 may connect to the router based on configuration information associated with the router.

Process 1100 proceeds to operation 1106, as illustrated in FIG. 11, in which first and second multimedia devices 102, 104 may receive multimedia data from the multimedia provider via the router under the first communication protocol.

Process 1100 proceeds to operation 1108, as illustrated in FIG. 11, in which at least one of first and second multimedia devices may determine that the router is unavailable.

Process 1100 proceeds to operation 1110, as illustrated in FIG. 11, in which at least one of first and second multimedia devices 102, 104 may send the configuration information associated with the router to charge station 802. For example, if the configuration information is stored in first multimedia device 102 (or second multimedia device 104), first multimedia device 102 (or second multimedia device 104) may send the configuration information to charge station 802. Alternatively, if the configuration information is already stored in charge station 802, there is no need for first and second multimedia devices 102, 104 to send the configuration information to charge station 802.

In some implementations, operation 1108 is performed before operation 1110, whereas in some other implementations, operation 1110 is performed before operation 1108, which is not limited herein.

Process 1100 proceeds to operation 1112, as illustrated in FIG. 11, in which charge station 802 may establish a first softAP based on the configuration information associated with the router.

Process 1100 proceeds to operation 1114, as illustrated in FIG. 11, in which charge station 802 may connect to the multimedia provider and receive the multimedia data from the multimedia provider via the first softAP.

Process 1100 proceeds to operation 1116, as illustrated in FIG. 11, in which charge station 802 may send the multimedia data to first multimedia device 102, second multimedia device 104, or both, via the first softAP. For example, by performing operations like those described above with reference to FIGS. 8-10D, charge station 802 may send the multimedia data to first multimedia device 102 and second multimedia device 104.

According to one aspect of the present disclosure, a wireless multimedia apparatus includes a first SoC. The first SOC includes a first memory configured to store first code and a first processor coupled to the first memory. When the first code is executed, the first processor is configured to determine that a router is available and connected to a multimedia provider under a first communication protocol. The first processor is configured to connect to the router based on configuration information associated with the router and receive multimedia data from the multimedia provider via the router under the first communication protocol. The first processor is configured to determine whether the router is still available. Responsive to the router being unavailable, the first processor is configured to turn on a first softAP based on the configuration information associated with the router to connect to the multimedia provider via the first softAP. The first processor is configured to receive the multimedia data from the multimedia provider via the first softAP under the first communication protocol.

In some implementations, the first processor is further configured to receive the configuration information associated with the router from the multimedia provider under a second communication protocol. Or, the first processor is configured to receive the configuration information associated with the router manually.

In some implementations, the multimedia provider includes a smart device or a cloud server. The first communication protocol is a WiFi-based multimedia communication protocol including a DLNA protocol or an airplay protocol. The second communication protocol is a Bluetooth communication protocol.

In some implementations, to determine whether the router is still available, the first processor is configured to receive a message from the multimedia provider under a second communication protocol, and determine whether the multimedia provider remains connected with the router based on the message. Responsive to the multimedia provider remaining connected with the router, the first processor is configured to determine that the router is still available. Or, responsive to the multimedia provider losing connection with the router, the first processor is configured to determine that the router is unavailable.

In some implementations, the wireless multimedia apparatus further includes a first multimedia device including the first SoC and configured to act as a primary multimedia device to receive the multimedia data from the multimedia provider via the first softAP responsive to the router being unavailable. The wireless multimedia apparatus further includes a second multimedia device coupled to the first multimedia device and configured to act as a secondary multimedia device to receive the multimedia data from the first multimedia device.

In some implementations, responsive to the router being unavailable, the second multimedia device is configured to receive the multimedia data via the first softAP from the first multimedia device.

In some implementations, responsive to the router being unavailable, a first connection under the first communication protocol is established between the multimedia provider and the first multimedia device via the first softAP, and the first multimedia device is configured to receive the multimedia data from the multimedia provider using the first connection. A second connection is established between the first and second multimedia devices, and the second multimedia device is configured to receive the multimedia data from the first multimedia device using the second connection.

In some implementations, the second connection is established between the first multimedia device and the second multimedia device via a second softAP created in the second multimedia device under the first communication protocol. The first and second connections are DLNA connections.

In some implementations, the second connection is established between the first and second multimedia devices under a second communication protocol. The second connection is a Bluetooth connection. The first connection is a DLNA connection or an airplay connection.

In some implementations, the first processor is further configured to detect whether the first multimedia device and the second multimedia device are in a charge station. Responsive to at least one of the first multimedia device or the second multimedia device being out of the charge station and the router being unavailable, the first processor is configured to turn on the first softAP.

In some implementations, the first processor is further configured to detect whether at least one of the first multimedia device or the second multimedia device is in an ear of a user. Responsive to at least one of the first multimedia device or the second multimedia device being in the ear and the router being unavailable, the first processor is configured to turn on the first softAP.

In some implementations, the first processor is further configured to detect whether a primary-secondary switching condition is satisfied between the first and second multimedia devices. Responsive to the primary-secondary switching condition being satisfied, the first processor is configured to switch the second multimedia device to act as the primary multimedia device and switch the first multimedia device to act as the secondary multimedia device.

In some implementations, the second multimedia device includes a second SoC, including a second memory configured to store second code and a second processor coupled to the second memory. When the second code is executed, the second processor is configured to, responsive to the second multimedia device acting as the primary multimedia device, establish a third softAP based on the configuration information associated with the router to connect to the multimedia provider via the third softAP, receive the multimedia data from the multimedia provider via the third softAP under the first communication protocol, transmit the multimedia data to the first multimedia device, and continue to receive a buffered portion of the multimedia data which is stored in a buffer of the first multimedia device from the first multimedia device. The buffered portion of the multimedia data is received from the multimedia provider by the first multimedia device before an establishment of the third softAP.

In some implementations, the first processor in the first multimedia device is further configured to, responsive to the third softAP being established in the second multimedia device, stop receiving the multimedia data from the multimedia provider via the first softAP, start to receive the multimedia data from the second multimedia device, continue to transmit the buffered portion of the multimedia data to the second multimedia device until the transmission of the buffered portion of the multimedia data completes, and turn off the first softAP when the transmission of the buffered portion of the multimedia data completes.

According to another aspect of the present disclosure, a wireless multimedia apparatus includes a first multimedia device including a first SoC. The first SoC includes a first memory configured to store first code and a first processor coupled to the first memory. When the first code is executed, the first processor is configured to determine that a router is available and connected to a multimedia provider under a first communication protocol, connect to the router based on configuration information associated with the router, and receive multimedia data from the multimedia provider via the router under the first communication protocol. The first processor is configured to determine whether the router is still available. Responsive to the router being unavailable, the first processor is configured to turn on a softAP based on the configuration information associated with the router to connect to the multimedia provider via the softAP, and receive the multimedia data from the multimedia provider via the softAP under the first communication protocol. The wireless multimedia apparatus further includes a second multimedia device including a second SoC. The second SoC includes a second memory configured to store second code and a second processor coupled to the second memory. When the second code is executed, the second processor is configured to receive the multimedia data from the first multimedia device.

According to yet another aspect of the present disclosure, a wireless communication method for a wireless multimedia apparatus is disclosed. The wireless communication method may include determining, by a processor of the wireless multimedia apparatus, that a router is available and connected to a multimedia provider under a first communication protocol. The wireless communication method may include connecting, by the processor, the wireless multimedia apparatus to the router based on configuration information associated with the router. The wireless communication method may include receiving, by the processor, multimedia data from the multimedia provider via the router under the first communication protocol. The wireless communication method may include determining, by the processor, whether the router is still available. Responsive to the router being unavailable, the wireless communication method may include turning on, by the processor, a softAP based on the configuration information associated with the router to connect to the multimedia provider via the softAP. The wireless communication method may include receiving, by the processor, the multimedia data from the multimedia provider via the softAP under the first communication protocol.

In some implementations, the wireless communication method further includes receiving the configuration information associated with the router from the multimedia provider under a second communication protocol. Or, the wireless communication method further includes receiving the configuration information associated with the router manually.

In some implementations, the wireless communication method further includes detecting whether the wireless multimedia apparatus is in a charge station. Responsive to the wireless multimedia apparatus being out of the charge station and the router being unavailable, the wireless communication method further includes turning on the softAP.

In some implementations, the wireless communication method further includes detecting whether the wireless multimedia apparatus is in an ear of a user. Responsive to the wireless multimedia apparatus being in the ear and the router being unavailable, the wireless communication method further includes turning on the softAP.

In some implementations, the wireless multimedia apparatus includes a first multimedia device configured to act as a primary multimedia device to receive the multimedia data from the multimedia provider via the first softAP responsive to the router being unavailable. The wireless multimedia apparatus further includes a second multimedia device coupled to the first multimedia device and configured to act as a secondary multimedia device to receive the multimedia data from the first multimedia device. The wireless communication method further includes detecting whether a primary-secondary switching condition is satisfied between the first and second multimedia devices. Responsive to the primary-secondary switching condition being satisfied, the wireless communication method further includes switching the second multimedia device to act as the primary multimedia device and switching the first multimedia device to act as the secondary multimedia device.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A wireless communication method for a wireless multimedia apparatus, comprising:
   determining, by a processor of the wireless multimedia apparatus, that a router is available and connected to a multimedia provider under a first communication protocol, wherein the first communication protocol is a WiFi-based multimedia communication protocol comprising a digital living network appliance (DLNA) protocol or an airplay protocol, wherein the router is different from the wireless multimedia apparatus, and the router is configured to establish a wireless local area network (LAN) upon which the first communication protocol depends;
   connecting, by the processor, the wireless multimedia apparatus to the router based on configuration information associated with the router through the wireless LAN;
   receiving, by the processor, multimedia data from the multimedia provider via the router under the first communication protocol;
   determining, by the processor, whether the router is still available; and
   responsive to the router being unavailable,
   turning on, by the processor, a soft access point (softAP), wherein the softAP on the wireless multimedia apparatus is configured using the configuration information associated with the router, and the first softAP is configured to replace the router to establish the wireless LAN;
   connecting, by the processor, to the multimedia provider via the wireless LAN established by the softAP; and
   receiving, by the processor, the multimedia data from the multimedia provider via the wireless LAN established by the softAP under the first communication protocol.

2. The wireless communication method of claim 1, further comprising:
   receiving the configuration information associated with the router from the multimedia provider under a second communication protocol; or
   receiving the configuration information associated with the router manually.

3. The wireless communication method of claim 1, further comprising:
   detecting whether the wireless multimedia apparatus is in a charge station; and
   responsive to the wireless multimedia apparatus being out of the charge station and the router being unavailable, turning on the softAP.

4. The wireless communication method of claim 1, further comprising:
   detecting whether the wireless multimedia apparatus is in an ear of a user; and
   responsive to the wireless multimedia apparatus being in the ear and the router being unavailable, turning on the softAP.

5. The wireless communication method of claim 1, wherein: the wireless multimedia apparatus comprises:
   a first multimedia device configured to act as a primary multimedia device to receive the multimedia data from the multimedia provider via the softAP responsive to the router being unavailable; and
   a second multimedia device coupled to the first multimedia device, and configured to act as a secondary multimedia device to receive the multimedia data from the first multimedia device; and the wireless communication method further comprises:
  detecting whether a primary-secondary switching condition is satisfied between the first and second multimedia devices; and
  responsive to the primary-secondary switching condition being satisfied,
  switching the second multimedia device to act as the primary multimedia device; and
  switching the first multimedia device to act as the secondary multimedia device.

6. A wireless multimedia apparatus, comprising: a first system on chip (SoC), comprising:
  a first memory configured to store first code; and
  a first processor coupled to the first memory, wherein when the first code is executed, the first processor is configured to:
    determine that a router is available and connected to a multimedia provider under a first communication protocol, wherein the first communication protocol is a WiFi-based multimedia communication protocol comprising a digital living network appliance (DLNA) protocol or an airplay protocol, wherein the router is different from the wireless multimedia apparatus, and the router is configured to establish a wireless local area network (LAN) upon which the first communication protocol depends;
    connect to the router based on configuration information associated with the router through the wireless LAN;
    receive multimedia data from the multimedia provider via the router under the first communication protocol;
    determine whether the router is still available; and
    responsive to the router being unavailable,
    turn on a first soft access point (softAP), wherein the first softAP on the wireless multimedia apparatus is configured using the configuration information associated with the router, and the first softAP is configured to replace the router to establish the wireless LAN;
    connect to the multimedia provider via the wireless LAN established by the first softAP; and
    receive the multimedia data from the multimedia provider via the wireless LAN established by the first softAP under the first communication protocol.

7. The wireless multimedia apparatus of claim 6, wherein the first processor is further configured to:
  receive the configuration information associated with the router from the multimedia provider under a second communication protocol; or
  receive the configuration information associated with the router manually.

8. The wireless multimedia apparatus of claim 7, wherein:
  the multimedia provider comprises a smart device or a cloud server;
  the second communication protocol is a Bluetooth communication protocol.

9. The wireless multimedia apparatus of claim 6, wherein to determine whether the router is still available, the first processor is configured to:
  receive a message from the multimedia provider under a second communication protocol;
  determine whether the multimedia provider remains connected with the router based on the message;
  responsive to the multimedia provider remaining connected with the router, determine that the router is still available; or
  responsive to the multimedia provider losing connection with the router, determine that the router is unavailable.

10. The wireless multimedia apparatus of claim 6, further comprising:
  a first multimedia device comprising the first SoC, and configured to act as a primary multimedia device to receive the multimedia data from the multimedia provider via the wireless LAN established by the first softAP responsive to the router being unavailable; and
  a second multimedia device coupled to the first multimedia device, and configured to act as a secondary multimedia device to receive the multimedia data from the first multimedia device.

11. The wireless multimedia apparatus of claim 10, wherein responsive to the router being unavailable, the second multimedia device is configured to receive the multimedia data via the wireless LAN established by the first softAP from the first multimedia device.

12. The wireless multimedia apparatus of claim 10, wherein responsive to the router being unavailable,
  a first connection under the first communication protocol is established between the multimedia provider and the first multimedia device via the wireless LAN established by the first softAP, and the first multimedia device is configured to receive the multimedia data from the multimedia provider using the first connection; and
  a second connection is established between the first and second multimedia devices, and the second multimedia device is configured to receive the multimedia data from the first multimedia device using the second connection.

13. The wireless multimedia apparatus of claim 12, wherein:
  the second connection is established between the first multimedia device and the second multimedia device via a second softAP created in the second multimedia device under the first communication protocol; and
  the first and second connections are digital living network appliance (DLNA) connections.

14. The wireless multimedia apparatus of claim 12, wherein:
  the second connection is established between the first and second multimedia devices under a second communication protocol;
  the second connection is a Bluetooth connection; and
  the first connection is a DLNA connection or an airplay connection.

15. The wireless multimedia apparatus of claim 10, wherein the first processor is further configured to:
  detect whether the first multimedia device and the second multimedia device are in a charge station; and
  responsive to at least one of the first multimedia device or the second multimedia device being out of the charge station and the router being unavailable, turn on the first softAP.

16. The wireless multimedia apparatus of claim 10, wherein the first processor is further configured to:
  detect whether at least one of the first multimedia device or the second multimedia device is in an ear of a user; and
  responsive to at least one of the first multimedia device or the second multimedia device being in the ear and the router being unavailable, turn on the first softAP.

17. The wireless multimedia apparatus of claim 10, wherein the first processor is further configured to:
  detect whether a primary-secondary switching condition is satisfied between the first and second multimedia devices; and responsive to the primary-secondary switching condition being satisfied, switch the second multimedia device to act as the primary multimedia device; and switch the first multimedia device to act as the secondary multimedia device.

18. The wireless multimedia apparatus of claim 17, wherein the second multimedia device comprises a second SoC, comprising:

a second memory configured to store second code; and a second processor coupled to the second memory, wherein when the second code is executed, the second processor is configured to:

responsive to the second multimedia device acting as the primary multimedia device, establish a third softAP based on the configuration information associated with the router to connect to the multimedia provider via the third softAP;

receive the multimedia data from the multimedia provider via the third softAP under the first communication protocol;

transmit the multimedia data to the first multimedia device; and continue to receive a buffered portion of the multimedia data which is stored in a buffer of the first multimedia device from the first multimedia device, wherein the buffered portion of the multimedia data is received from the multimedia provider by the first multimedia device before an establishment of the third softAP.

19. The wireless multimedia apparatus of claim 18, wherein the first processor in the first multimedia device is further configured to:

responsive to the third softAP being established in the second multimedia device, stop receiving the multimedia data from the multimedia provider via the first softAP;

start to receive the multimedia data from the second multimedia device;

continue to transmit the buffered portion of the multimedia data to the second multimedia device until transmission of the buffered portion of the multimedia data completes; and turn off the first softAP when the transmission of the buffered portion of the multimedia data completes.

20. A wireless multimedia apparatus, comprising: a first multimedia device comprising a first system on chip (SoC), comprising:

a first memory configured to store first code; and a first processor coupled to the first memory, wherein when the first code is executed, the first processor is configured to:

determine that a router is available and connected to a multimedia provider under a first communication protocol, wherein the first communication protocol is a WiFi-based multimedia communication protocol comprising a digital living network appliance (DLNA) protocol or an airplay protocol, wherein the router is different from the first multimedia apparatus, and the router is configured to establish a wireless local area network (LAN) upon which the first communication protocol depends;

connect to the router based on configuration information associated with the router through the wireless LAN;

receive multimedia data from the multimedia provider via the router under the first communication protocol;

determine whether the router is still available; and responsive to the router being unavailable, turn on a soft access point (softAP), wherein the softAP on the first multimedia device is configured using the configuration information associated with the router, and the first softAP is configured to replace the router to establish the wireless LAN;

connect to the multimedia provider via the wireless LAN established by the softAP; and receive the multimedia data from the multimedia provider via the wireless LAN established by the softAP under the first communication protocol; and a second multimedia device comprising a second SoC, comprising:

a second memory configured to store second code; and a second processor coupled to the second memory, wherein when the second code is executed, the second processor is configured to receive the multimedia data from the first multimedia device.

* * * * *